United States Patent
Igarashi

(10) Patent No.: US 8,673,514 B2
(45) Date of Patent: Mar. 18, 2014

(54) FUEL CELL SYSTEM AND BOOST CONVERTER FOR FUEL CELL

(75) Inventor: Fusaki Igarashi, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 799 days.

(21) Appl. No.: 12/811,019

(22) PCT Filed: Dec. 26, 2008

(86) PCT No.: PCT/JP2008/073771
§ 371 (c)(1),
(2), (4) Date: Jun. 28, 2010

(87) PCT Pub. No.: WO2009/084649
PCT Pub. Date: Jul. 9, 2009

(65) Prior Publication Data
US 2010/0291445 A1   Nov. 18, 2010

(30) Foreign Application Priority Data

Dec. 28, 2007   (JP) .................................. 2007-341289

(51) Int. Cl.
*H01M 8/04* (2006.01)
*B60L 11/18* (2006.01)
*H02M 3/155* (2006.01)

(52) U.S. Cl.
USPC ............................... 429/432; 429/430; 318/12

(58) Field of Classification Search
None
See application file for complete search history.

(56) References Cited

U.S. PATENT DOCUMENTS

| 5,444,594 | A | 8/1995 | Tanaka et al. |
| 5,535,085 | A | 7/1996 | Tanaka et al. |
| 5,572,418 | A | 11/1996 | Kimura et al. |
| 2004/0119447 | A1 | 6/2004 | Kato |
| 2010/0104906 | A1* | 4/2010 | Hirakawa et al. ............... 429/22 |

FOREIGN PATENT DOCUMENTS

| JP | 5-236734 | A |   | 9/1993 |
| JP | 6-189444 | A |   | 7/1994 |
| JP | 7-75459 | A |   | 8/1995 |
| JP | 8-116663 | A |   | 5/1996 |
| JP | 10-164709 | A |   | 6/1998 |
| JP | 2003-217625 | A |   | 7/2003 |
| JP | 2005-143259 | A |   | 6/2005 |
| JP | 2006-87284 | A |   | 3/2006 |
| JP | 2006-121850 | A |   | 5/2006 |
| JP | 2006121850 | A | * | 5/2006 |
| JP | 2007-181328 | A |   | 7/2007 |
| JP | 2007-228781 | A |   | 9/2007 |
| JP | 2007228781 | A | * | 9/2007 |
| WO | WO 2006/098376 | A1 |   | 9/2006 |

* cited by examiner

*Primary Examiner* — John S Maples
(74) *Attorney, Agent, or Firm* — Kenyon & Kenyon LLP

(57) ABSTRACT

Provided is a fuel cell system including a fuel cell which is a DC power source and boosting unit which boosts the output voltage of the fuel cell for supply to a load. The boosting unit has: a main boosting unit which has a switch and a coil and boosts the output voltage of the fuel cell by a back electromotive force of the coil generated by a switching operation of the switch with respect to the coil; and a sub boosting unit having a snubber capacitor which adjusts a potential difference between the both electrodes of the switch by an accumulation amount and reduces the switching loss of the switch by adjusting the accumulation amount of the snubber capacitor upon a switching operation. The electricity of the snubber capacitor discharged when reducing the accumulation amount of the snubber capacitor is made to flow into processing unit other than the fuel cell by the sub boosting unit.

5 Claims, 21 Drawing Sheets

GRAPH OF CORRELATION BETWEEN MOTOR
NECESSARY VOLTAGE AND FC VOLTAGE
(FC BOOST CONVERTER NOT PROVIDED)

GRAPH OF CORRELATION BETWEEN MOTOR
NECESSARY VOLTAGE AND FC VOLTAGE
(FC BOOST CONVERTER PROVIDED)

GRAPH OF CORRELATION BETWEEN BATTERY IV
CHARACTERISTIC AND FC IV CHARACTERISTIC

GRAPH OF CORRELATION BETWEEN BATTERY IV
CHARACTERISTIC AND FC IV CHARACTERISTIC

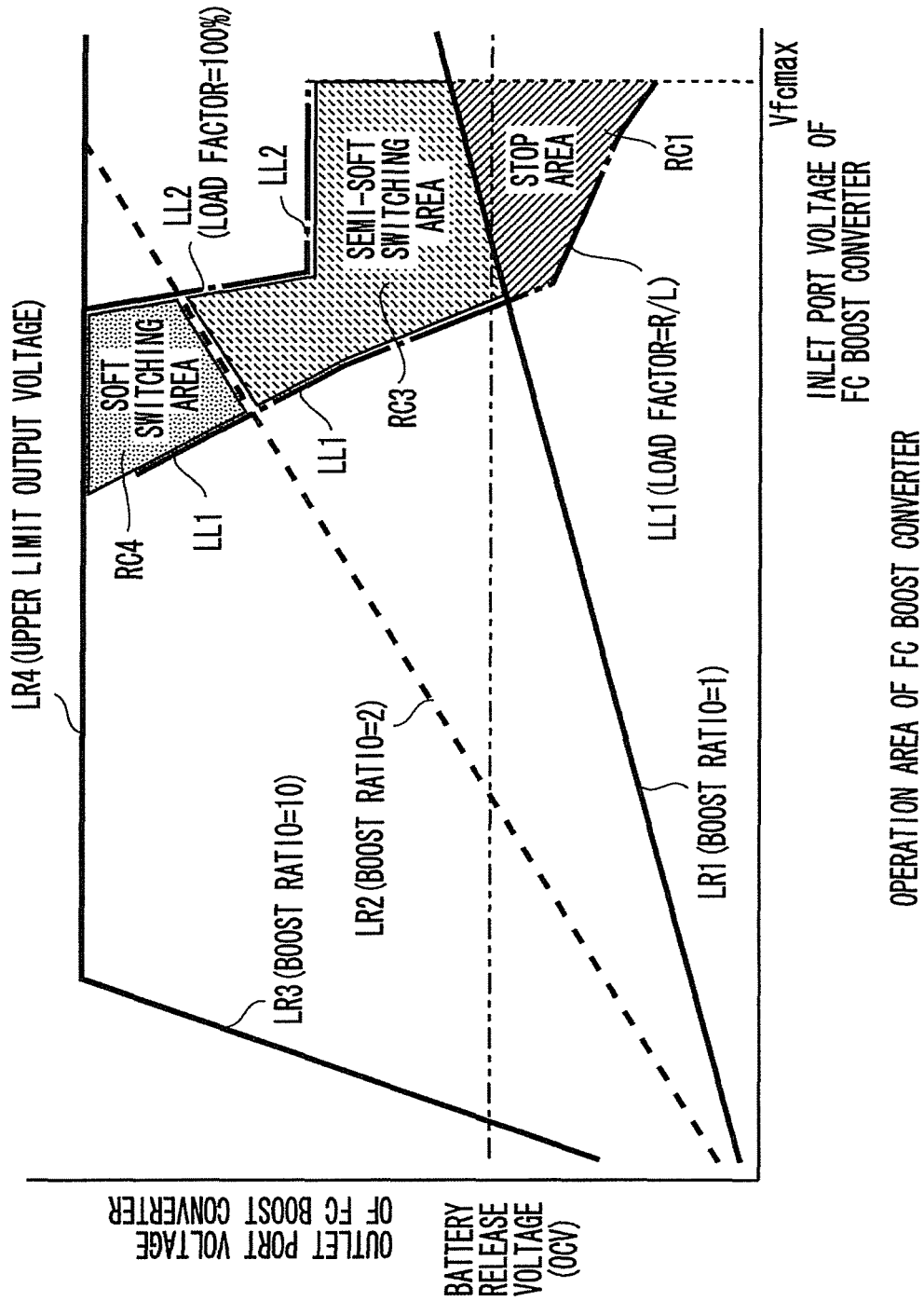

VH/VL > 2

VH/VL < 2

FUEL CELL SYSTEM AND BOOST CONVERTER FOR FUEL CELL

This is a 371 national phase application of PCT/JP2008/073771 filed 26 Dec. 2008, claiming priority to Japanese Patent Application No. 2007-341289 filed 28 Dec. 2007, the contents of which are incorporated herein by reference.

FIELD OF THE INVENTION

The present invention relates to a fuel cell system and a boost converter for a fuel cell.

BACKGROUND OF THE INVENTION

Over the recent years, a fuel cell has been focused as a power source that is excellent in terms of operation efficiency and environmental compatibility. The fuel cell is capable of outputting the electric power in response to a request of a load by controlling a quantity of supply of fuel gas, however, there is a case in which the output voltage of the fuel cell is not coincident with the voltage requested by the load. Such being the case, a technology (refer to e.g., Patent documents 1 and 2) is proposed, which makes the output voltage of the fuel cell coincident with the voltage requested by the load in such a way that a DC-DC converter converts the output voltage of the fuel cell.

The DC-DC converter includes an electronic switch, a diode and an inductance as basic elements, and converts the voltage through a switching operation of the electronic switch. The DC-DC converter, a ripple being caused by the switching operation of the electronic switch, includes a snubber circuit for absorbing this ripple. The snubber circuit absorbs the ripple with a capacitor. If an electric charge accumulated in this capacitor is not effectively utilized, energy conversion efficiency of the DC-DC converter decreases, and hence there is proposed a technology of effectively utilizing the electric charge accumulated in the capacitor by regenerating the electric charge, and so on (refer to e.g., Patent documents 3-7)

[Patent document 1] Japanese Patent Laid-Open Publication No. 2007-228781
[Patent document 2] Japanese Patent Laid-Open Publication No. 2003-217625
[Patent document 3] Japanese Patent Laid-Open Publication No. H08-116663
[Patent document 4] Japanese Examined Patent Publication No. H07-75459
[Patent document 5] Japanese Patent Laid-Open Publication No. H06-189444
[Patent document 6] Japanese Patent Laid-Open Publication No. 2005-143259
[Patent document 7] Japanese Patent Laid-Open Publication No. H10-164709

SUMMARY OF THE INVENTION

Problem to be Solved by the Invention

The fuel cell generates the electricity by causing electrochemical reaction of the fuel gas with a catalyst electrode bearing a catalyst such as platinum. Further, in the fuel cell, the catalyst electrode and a high polymer electrolyte is structured extremely minutely in order to realize compact-size/high-output. Hence, it is not preferable that a high-potential voltage is applied to the fuel cell.

It is known that the DC-DC converter is capable of reducing a switching loss by conducting soft switching, however, if this DC-DC converter is used for boosting of the fuel cell, the electric power accumulated for the soft switching might be inputted to the fuel cell, and the application thereof is hard to be done. It is therefore an object of the present invention, which was devised in view of the problems, to provide a fuel cell system and a boost converter for a fuel cell, which are capable of boosting an output voltage of the fuel cell through soft switching.

Means for Solving the Problem

In the present invention, for solving the problems given above, on the occasion of boosting an output voltage of a fuel cell with counter electromotive force (voltage) of a coil that is generated by a switching operation, the electricity released from a snubber capacitor that realizes the soft switching by adjusting a voltage between two poles of a switch, is flowed to a portion other than the fuel cell to thereby process the electricity.

Specifically, a fuel cell system has: a fuel cell as a DC power source; and a boost unit boosting an output voltage of the fuel cell, the boost unit including: a main boost unit having a switch and a coil, and boosting the output voltage of the fuel cell with counter electromotive force of the coil that is generated by the switch performing a switching operation with respect to the coil; and an auxiliary boost unit having a snubber capacitor adjusting a potential difference between two poles of the switch with a quantity of accumulated electricity, and reducing a switching loss of the switch by adjusting the quantity of accumulated electricity of the snubber capacitor when performing the switching operation, wherein the auxiliary boost unit conducts the electricity of the snubber capacitor, which is released when reducing the quantity of accumulated electricity of the snubber capacitor, to a processing unit other than the fuel cell to thereby process the electricity.

The fuel cell system is a system enabling a load to be supplied with a voltage higher than the output voltage of the fuel cell by use of the boost unit which boosts the voltage of the DC power source. Herein, the boost unit includes the main boost unit handling a role of boosting the output voltage of the fuel cell and the auxiliary boost unit handling a role of reducing a loss of electric energy generated in the main boost unit. The main boost unit, on the occasion boosting the output voltage of the fuel cell as the DC power source, utilizes the counter electromotive force of the coil. Namely, the counter electromotive force of the coil is generated by controlling the current flowing across the coil with the switching operation, thereby boosting the output voltage of the fuel cell.

The switch of the main boost unit controls the flow of the current of the coil with the switching operation, however, the switching loss occurs due to a transient state when performing the switching operation. Herein, a quantity of the switching loss can be reduced by adjusting variation speeds of the voltage and the current in the transient state by making use of a time constant of the capacitor. Such being the case, in the fuel cell system, the snubber capacitor of the auxiliary boost unit adjusts the variation speeds of the voltage and the current in the transient state, thereby reducing the switching loss of the switch of the main boost unit.

Herein, the auxiliary boost unit actively adjusts the quantity of accumulated electricity of the snubber capacitor before the switch of the main boost unit operates, thereby enabling a capacity of the capacitor to be effectively exhibited. Namely, the quantity of accumulated electricity of the snubber capacitor is adjusted corresponding to a mode of a predicted potential variation so as to relieve the fluctuation in potential difference between the two poles of the switch after performing the switching operation. For example, before the switch transitions to a non-conductive state, the potential difference between the two poles when switching is restrained from rapidly expanding by previously accumulating the electric charge in the snubber capacitor, and, before the switch transitions to a conductive state, the potential difference between the two poles when switching is restrained from rapidly shrinking by releasing the electric charge in the snubber capacitor.

By the way, on the occasion of releasing the electricity accumulated in the snubber capacitor, it is required that the electricity be processed by some sort of method. Herein, when processing the electricity by flowing the electricity to the fuel cell, the high-potential voltage might be applied to the fuel cell, which is not preferable aspect. This being the case, in the fuel cell system, the electricity released from the snubber capacitor of the auxiliary boost unit is conducted to a processing unit other than the fuel cell. Herein, the processing unit includes whatever means capable of processing the electricity accumulated in the snubber capacitor, and includes the means which, e.g., temporarily stores the electricity accumulated in the snubber capacitor, regenerates the electricity to the load, etc., and consumes the electricity by itself or discharges the electricity outside the system.

As described above, according to the fuel cell system, the electric power accumulated when conducting the soft switching is not applied to the fuel cell, and hence the output voltage of the fuel cell can be boosted by the soft switching.

Further, the fuel cell system may further have the auxiliary boost unit regenerating the electricity released when reducing the quantity of accumulated electricity of the snubber capacitor into an electric path which connects the main boost unit as the processing unit to the fuel cell to thereby process the electricity, a buffering unit buffering a fluctuation in voltage of the electric path, which is caused by the regenerated electric power of the auxiliary boost unit.

The electricity accumulated in the snubber capacitor is the electricity that is output from the fuel cell. It is therefore preferable in terms of the energy efficiency that the electricity accumulated in the snubber capacitor is regenerated to the load. Then, in the fuel cell system, the electricity released from the snubber capacitor is regenerated by flowing the electricity to the electric path which connects the main boost unit to the fuel cell.

Herein, when regenerating the electricity of the snubber capacitor to the electric path connecting the main boost unit to the fuel cell, the voltage of the electric path rises by dint of the regenerative power, and the voltage of the electric path might exceed the output voltage of the fuel cell. In this case, the regenerative power flows to the fuel cell, and the high-potential voltage is applied to the fuel cell. Such being the case, in the fuel cell system, the buffering unit relieves the fluctuation in voltage of the electric path, which is caused by the regenerative power. The buffering unit relieves the fluctuation in voltage of the electric path to thereby weaken the rise in voltage of the electric path due to the regenerative power, and the high-potential voltage is restrained from being applied to the fuel cell.

Still further, the fuel cell system may further have the auxiliary boost unit regenerating the electricity released when reducing the quantity of accumulated electricity of the snubber capacitor into an electric path which connects the main boost unit as the processing unit to the fuel cell to thereby process the electricity, and a constant voltage unit which, if the voltage of the electric path, which fluctuates due to the regenerated power of the auxiliary boost unit, exceeds a specified voltage, conducts the electricity of the electric path to the earth.

The point that the high-potential voltage might be applied to the fuel cell when regenerating the electricity of the snubber capacitor is as described above. Then, in the fuel cell system, the voltage of the electric path is decreased in the case where the high-potential voltage is applied to the fuel cell. Namely, if the potential of the electric path connecting the fuel cell which flows the regenerative power to the main boost unit exceeds a specified voltage, the electricity of this electric path is flowed to the earth. With this contrivance, the voltage of the electric path is lowered, and the high-potential voltage is restrained from being applied to the fuel cell. Note that the earth herein is a concept representing an electric conductor serving as a reference potential of electronic devices configuring the fuel cell system and peripheral equipment but is not limited to the ground etc that is generally utilized as the reference potential point. Further, the specified voltage connotes the voltage of the electric path connecting the fuel cell to the main boost unit and is an upper limit value of the voltage of the fuel cell, which is determined in terms of protecting the fuel cell.

Yet further, the fuel cell system may further have the auxiliary boost unit regenerating the electricity released when reducing the quantity of accumulated electricity of the snubber capacitor into an electric path which connects the main boost unit as the processing unit to the fuel cell to thereby process the electricity, a rectifying unit preventing the regenerated power of the auxiliary boost unit from flowing to the fuel cell via the electric path. A rise in voltage of the fuel cell can be prevented by hindering the flow of the regenerated power to the fuel cell. Namely, the fuel cell system includes the rectifying unit which permits the current to flow in only a fixed direction but inhibits the current from flowing in the reversed direction, and the rectifying unit prevents the regenerative power from flowing to the fuel cell. This contrivance prevents the high-potential voltage from being applied to the fuel cell due to the regenerative power.

Moreover, the fuel cell system may further have a secondary battery as the processing unit, wherein the auxiliary boost unit may flow the electricity released when reducing the quantity of accumulated electricity of the snubber capacitor to the secondary battery to thereby process the electricity. The electricity accumulated in the snubber capacitor is the electricity that is output from the fuel cell and is effectively, it is preferable as described above, utilized in terms of the energy efficiency. Herein, it is considered that the effective utilization of the electricity of the snubber capacitor involves using a method of directly regenerating the electricity to the load via the main boost unit and, in addition, a method of scheming to make the effective utilization by accumulating the electricity of the snubber capacitor. The fuel cell system is the system configured in terms of scheming to make the effective utilization by accumulating the electricity of the snubber capacitor, and includes the secondary battery capable of accumulating the electricity. Then, the electricity released from the snubber capacitor is flowed to this secondary battery. With this contrivance, the electricity of the snubber capacitor is accumulated in the secondary battery, and the accumulated electricity can be effectively utilized.

Furthermore, the main boost unit may include: a first coil having one end connected to a cathode of the fuel cell; a first switch having one end connected to the other end of the first coil and having the other end connected to an anode of the fuel cell; a first diode connected, on the anode side, to the other end of the coil and connected, on the cathode side, to the load; and a smoothing capacitor connecting the cathode side of the first diode to the other end of the first switch, and the auxiliary boost unit may include: a second diode connected, on the anode side, to an electric path branching off from the electric path connecting the first coil to the first switch; the snubber capacitor connecting the anode side of the second diode to the other end of the first switch; a second coil having one end connected to an electric path branching off from the electric path connecting the cathode side of the second diode to the snubber capacitor; a third diode connected, on the anode side, to the other end of the second coil; and a second switch having one end connected to the cathode side of the third diode and having the other end connected to the processing unit.

According to the configuration described above, the counter electromotive force is generated in the first coil through the switching operation of the first switch, and the output voltage of the fuel cell is boosted. Further, the fluctuations in voltage and current due to the switching operation of the first switch are controlled by the first diode of the main boost unit and the smoothing capacitor so as to come to a supply-enabled degree to the load. Hence, the electric power boosted and supplied to the load from the fuel cell becomes a state (quality) having the supply-enabled degree to the load. Moreover, the second switch which releases the electricity of the snubber capacitor to the processing unit, cooperates with the second coil which takes the electricity out of the snubber capacitor, whereby the electricity accumulated in the snubber capacitor can be released.

Further, a boost converter for a fuel cell, for boosting an output voltage of the fuel cell as a DC power source and thus supplying the output voltage to a load, has: a main boost unit having a switch and a coil, and boosting the output voltage of the fuel cell with counter electromotive force of the coil that is generated by the switch performing a switching operation with respect to the coil; and an auxiliary boost unit having a snubber capacitor adjusting a potential difference between two poles of the switch with a quantity of accumulated electricity, and reducing a switching loss of the switch by adjusting the quantity of accumulated electricity of the snubber capacitor when performing the switching operation, wherein the auxiliary boost unit conducts the electricity of the snubber capacitor, which is released when reducing the quantity of accumulated electricity of the snubber capacitor, to a processing unit other than the fuel cell to thereby process the electricity. According to this configuration, the output voltage of the fuel cell can be boosted by the soft switching.

Effects of the Invention

The fuel cell system and the boost converter for the fuel cell according to the present invention enable the output voltage of the fuel cell to be boosted by the soft switching.

BRIEF DESCRIPTION OF THE DRAWINGS

[FIG. 8B] A second map showing the process executed by the FC boost converter in a way that associates the process with the operation area formed by giving the inlet port voltage of the FC boost converter along the axis of abscissa and the outlet port voltage thereof along the axis of ordinates in the fuel cell according to the working example of the present invention.

[FIG. 10B] A second diagram illustrating the correlation between the ratio VH/VL between the outlet port voltage of

DESCRIPTION OF THE REFERENCE NUMERALS AND SYMBOLS

Figure 1:
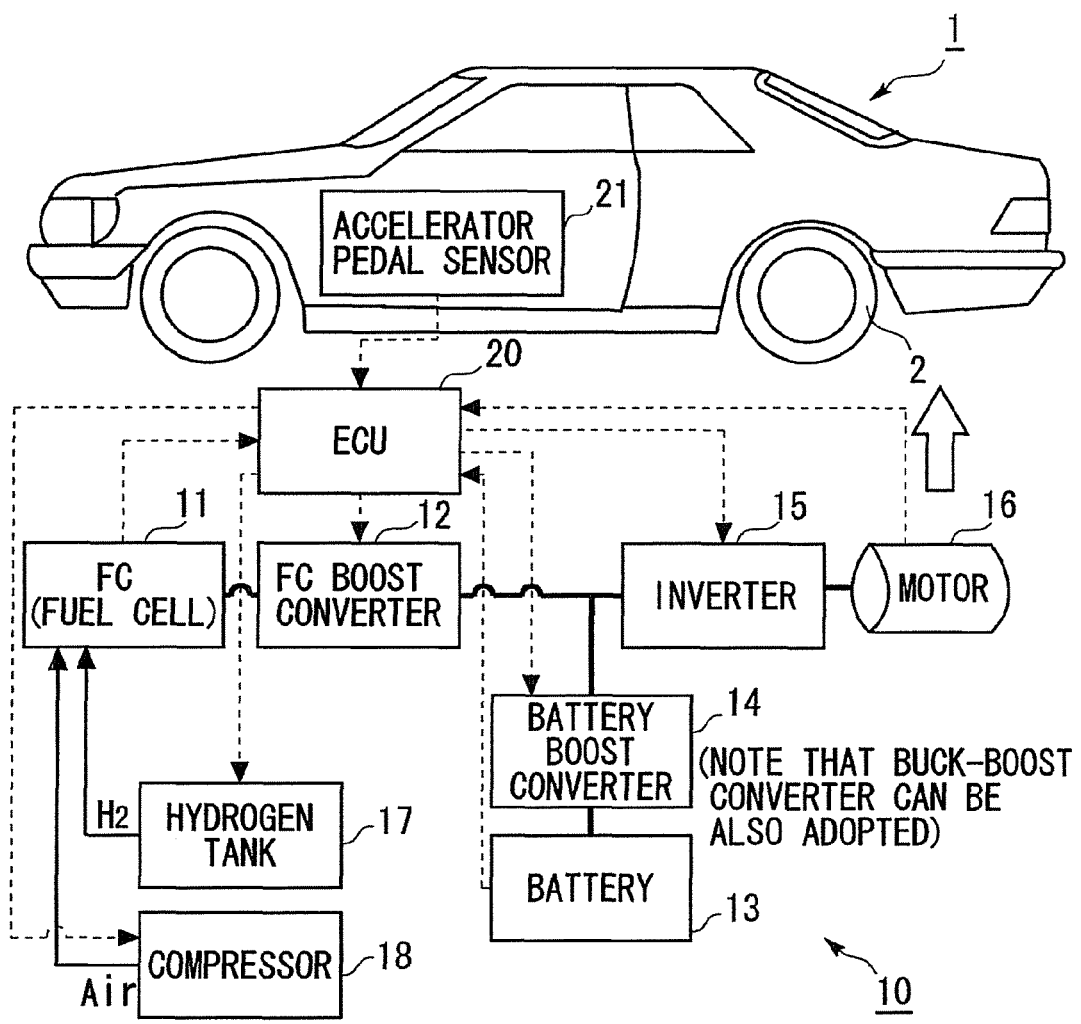
[FIG. 1] A diagram illustrating an outline of a configuration of a fuel cell system according to a working example of the present invention.

1 . . . vehicle
10 . . . fuel cell system
11 . . . fuel cell (FC)
12 . . . FC boost converter
12$a$ . . . main boost circuit
12$b$ . . . auxiliary circuit
13 . . . battery
14 . . . battery boost converter
15 . . . inverter
16 . . . motor
20 . . . ECU
21 . . . accelerator pedal sensor
S1,S2,S3 . . . switching element
C1, C3 . . . smoothing capacitor
C2 . . . snubber capacitor
L1, L2, L3 . . . coil
D1, D2, D3, D4, D5, D6 . . . diode
ZD . . . . Zener diode
V . . . varistor

DETAILED DESCRIPTION

An in-depth description of an embodiment of a fuel cell system 10 according to the present invention will be made based on drawings. The fuel cell system 10 according to the embodiment supplies electric power to a drive motor 16 classified as a driving apparatus of a vehicle 1 as a movable body and can be applied to movable bodies such as ships and robots other than the vehicle 1 and to bodies that are not movable but need to be supplied with the electric power.

FIRST WORKING EXAMPLE

FIG. 1 schematically illustrates an outline of a configuration of the fuel cell system 10 according to the present invention and the vehicle 1 of the movable body of which a drive source is the electric power supplied from the fuel cell system 10. Drive wheels 2 are driven by the drive motor (which will hereinafter simply be referred to as the [motor]) 16, whereby the vehicle 1 drives itself and thus gets movable. This motor 16 is a so-called three-phase AC (Alternating Current) motor and supplied with AC power from an inverter 15. Further, this inverter 15 is supplied with DC (Direct Current) power from a fuel cell (which is also abbreviated to [FC]) 11 defined as a main power source of the fuel cell system 10 and from a battery 13 defined as a secondary battery, and the supplied DC power is converted into the alternating current (AC) by the inverter 15.

Herein, the fuel cell 11 generates the electricity with electrochemical reaction between a hydrogen gas reserved in a hydrogen tank 17 and oxygen contained in the air that is pressure-fed by a compressor 18, and an FC boost converter 12 classified as a boost type DC-DC converter is electrically connected to between the fuel cell 11 and the inverter 15. With this electric connection, an output voltage from the fuel cell 11 is boosted up to an arbitrary voltage in a controllable range by the FC boost converter 12 and then applied to the inverter 15. Further, the boost operation of the FC boost converter 12 also enables a terminal voltage of the fuel cell 11 to be controlled. Note that an in-depth description of the FC boost converter 12 will be made later on. Further, the battery 13 is a chargeable/dischargeable storage battery device, and a boost type battery boost converter 14 is electrically connected to between the battery 13 and the inverter 15 so as to be parallel to the FC boost converter 12 with respect to the inverter 15. With this arrangement, an output voltage from the battery 13 is boosted up to an arbitrary voltage in the controllable range by the battery boost converter 14 and then applied to the inverter 15. Moreover, the boost operation of this battery boost converter 14 enables the terminal voltage of the inverter 15 to be controlled. It should be noted that as illustrated in FIG. 1, in the fuel cell system 10, a buck-boost converter capable of performing the boost operation and a buck operation (depressurization) can be adopted in place of the boost type battery boost converter 14. The discussion on the following working example will proceed mainly on the assumption that the battery boost converter 14 is the boost type converter, however, this scheme does not intend to restrict the adoption of the buck-boost converter, and a proper adjustment will be made on the occasion of adopting the buck-boost converter. Then, the further should-be-specially-described facts owing to the adoption of the buck-boost converter will be adequately disclosed.

Moreover, the vehicle 1 includes an electronic control unit (which will hereinafter be abbreviated to [ECU]) 20 electrically connected to the respective control target components, thereby controlling the power generation of the fuel cell 11 and the actuation of the motor 16. For example, the vehicle 1 is provided with an accelerator pedal which receives an acceleration request from a user, an accelerator pedal sensor 21 detects an accelerator opening degree, and a detection signal thereof is electrically transmitted to the ECU 20. Further, the ECU 20 is electrically connected to an encoder which detects the number of revolutions of the motor 16, whereby the number of revolutions of the motor 16 is detected by the ECU 20. The ECU 20 can perform various types of control based on these detected values etc.

In the thus-configured fuel cell system 10, the accelerator pedal sensor 21 detects the opening degree of the accelerator pedal trodden by the user of the vehicle 1, and the ECU 20 properly controls, based on the accelerator opening degree and the number of revolutions of the motor 16, a quantity of power generation of the fuel cell 11 and a charging/discharging quantity from the battery 13. Herein, the motor 16 is a PM (Permanent Magnet) motor based on high-voltage low-current specifications in order to improve fuel consumption of the vehicle 1 as the movable body. Accordingly, the motor 16 is capable of exhibiting a high torque at a low current, thereby enabling a reduction of the heat evolved by winding wires and other wires arranged in an interior of the motor and also a decrease in rated output of the inverter 15. To be specific, in the motor 16, its counter electromotive voltage is set comparatively high for enabling a comparatively large torque output to be attained at the low current, while the voltage supplied from the fuel cell system 10 is set high so as to enable the drive to be done with the large number of revolutions in a way that resists the high counter electromotive voltage. At this time, the FC boost converter 12 is provided between the fuel cell 11 and the inverter 15, and the battery boost converter 14 is also provided between the battery 13 and the inverter 15, thus scheming to increase the voltage supplied to the inverter 15. Though iterative in explanation, the buck-boost converter can be adopted as the substitute for this battery boost converter 14.

Thus, the fuel cell system 10 is configured to include the FC boost converter 12, whereby the motor 16 can be actuated through the boost operation of the FC boost converter 12 even when the output voltage (the inter-terminal voltage) of the fuel cell 11 itself to thereby enable the fuel cell 11 to be downsized by decreasing the number of cell stacks of the fuel cell 11. As a result, a weight of the vehicle 1 can be reduced, and the improvement of the fuel consumption can be further expedited.

Herein, in the fuel cell system 10, the fuel cell 11 capable of generating the electric power is the main power source for the motor 16. Accordingly, it is considered for improving efficiency of the fuel cell system 10 that a decrease in power loss in the FC boost converter 12 interposed between the fuel cell 11 and the inverter 15 largely contributes to ameliorate the efficiency of the whole system. As a matter of course, the same thing can be applied in principle to the battery boost converter 14 existing between the battery 13 and the inverter 15.

Figure 2:
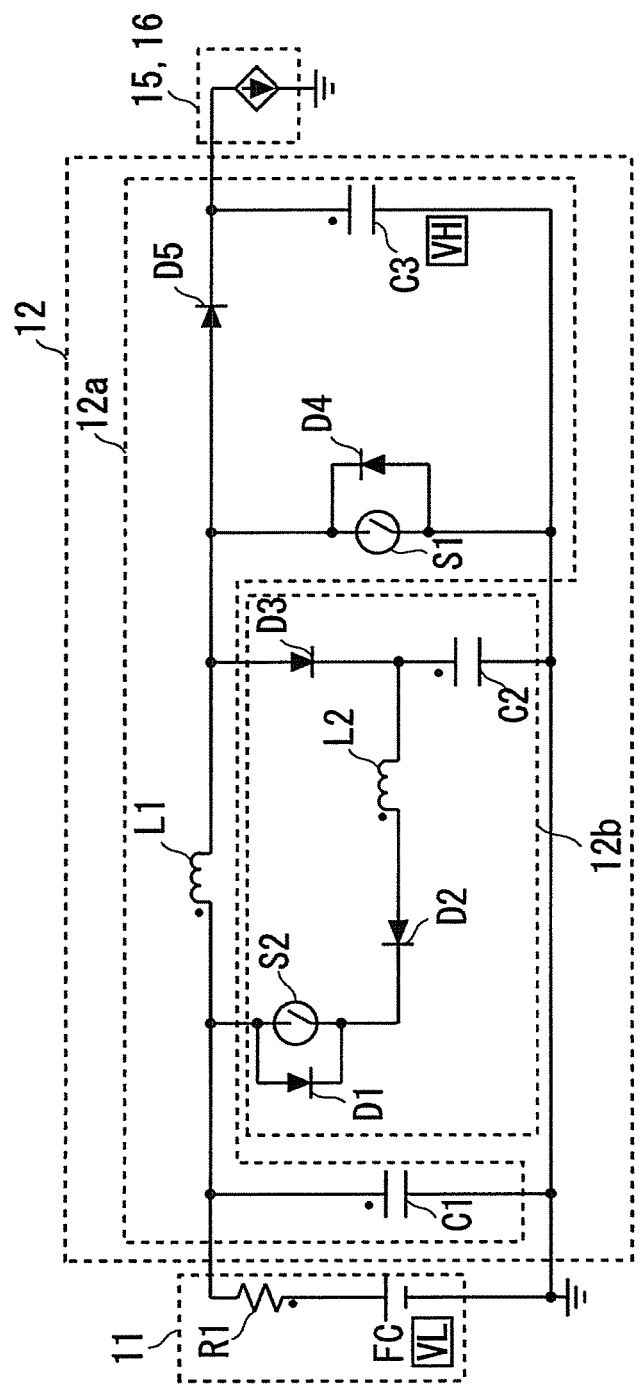
[FIG. 2] A first diagram illustrating a configuration of an electric circuit of the fuel cell system shown in FIG. 1, especially a configuration of an electric circuit of an FC boost converter.

Herein, characteristics of electric circuits of the FC boost converter 12 will hereinafter be described based on FIG. 2. FIG. 2 is a diagram showing an electric configuration of the fuel cell system 10, however, the illustrations of the battery 13 and the battery boost converter 14 are omitted for simplifying the description.

The FC boost converter 12 is constructed of a main boost circuit 12a for conducting the boost operation as the DC-DC converter and of an auxiliary circuit 12b for performing a soft switching operation which will be explained later on. The main boost circuit 12a boosts the output voltage of the fuel cell 11 by releasing an energy accumulated in a coil L1 towards the side of the motor 16 (the side of the inverter 15) via a diode D5 with a switching operation of a switching circuit constructed of a switching element S1 and a diode D4. Specifically, one end of the coil L1 is connected to a terminal, on a high potential side, of the fuel cell 11. Then, a pole of one end of the switching element S1 is connected to other end of the coil L1, while a pole of the other end of the switching element S1 is connected to the terminal, on a low potential side, of the fuel cell 11. Moreover, an anode terminal of the diode D5 is connected to the other end of the coil L1, and further a capacitor C3 is connected to between a cathode terminal of the diode D5 and the other end of the switching element S1. Note that in this main boost circuit 12a, the capacitor C3 functions as a smoothing capacitor of the boost voltage. It is also noted that the main boost circuit 12a is provided with a smoothing capacitor C1 on the side of the fuel cell 11, whereby a ripple of the output current of the fuel cell 11 can be reduced. A voltage VH applied to this smoothing capacitor C3 becomes an outlet port voltage of the FC boost converter 12. Further, in FIG. 2, VL represents the power source voltage of the fuel cell 11, which is the voltage applied to the smoothing capacitor C1 and becomes an inlet port voltage of the FC boost converter 12.

Next, the auxiliary circuit 12b, at first, embraces a first series connector including a diode D3 connected in parallel to the switching element S1 and a snubber capacitor C2 connected in series to the diode D3. In this first series connecting module, an anode terminal of the diode D3 is connected to the other end of the coil L1, and a cathode terminal thereof is connected to one end of the snubber capacitor C2. Moreover, the other end of the snubber capacitor C2 is connected to the terminal, on the low current side, of the fuel cell 11. Further, the auxiliary circuit 12b embraces a second series connecting module in which a coil L2 defined as an induction element, a diode D2 and a switching circuit constructed of a switching element S2 and a diode D1 are connected in series. In the second series connecting module, one end of the coil L2 is connected to a connecting point between the diode D3 and the snubber capacitor C2 of the first series connecting module. Moreover, the anode terminal of the diode D2 is connected to the other end of the coil L2, and the cathode terminal thereof is connected to one end of the switching element S2. Moreover, the other end of the switching element S2 is connected to one end side of the coil L1. Note that a circuit topology of the second series connecting module can adopt a mode of properly exchanging the series order of the switching circuit including the coil L2, the diode D2, the switching element S2, etc. Especially, as a substitute for the state illustrated in FIG. 2, the coil L1 and the coil L2 can be integrated in an actual packaging circuit by exchanging the order of the switching circuit including the coil L2, the switching element S2, etc, and the modularization of the semiconductor elements is facilitated.

The thus-configured FC boost converter 12 adjusts a switching duty ratio of the switching element S1, thereby controlling a boost ratio of the FC boost converter 12, i.e., controlling a ratio of the output voltage of the FC boost converter 12 that is applied to the inverter 15 to the output voltage of the fuel cell 11 that is inputted to the FC boost converter 12. Further, the so-called soft switching, which will be described later of, is realized in such a way that the switching operation of the switching element S2 of the auxiliary circuit 12b intervenes in the switching operation of the switching element S1, thereby enabling a switching loss in the FC boost converter 12 to be reduced to a great degree.

Figure 3:
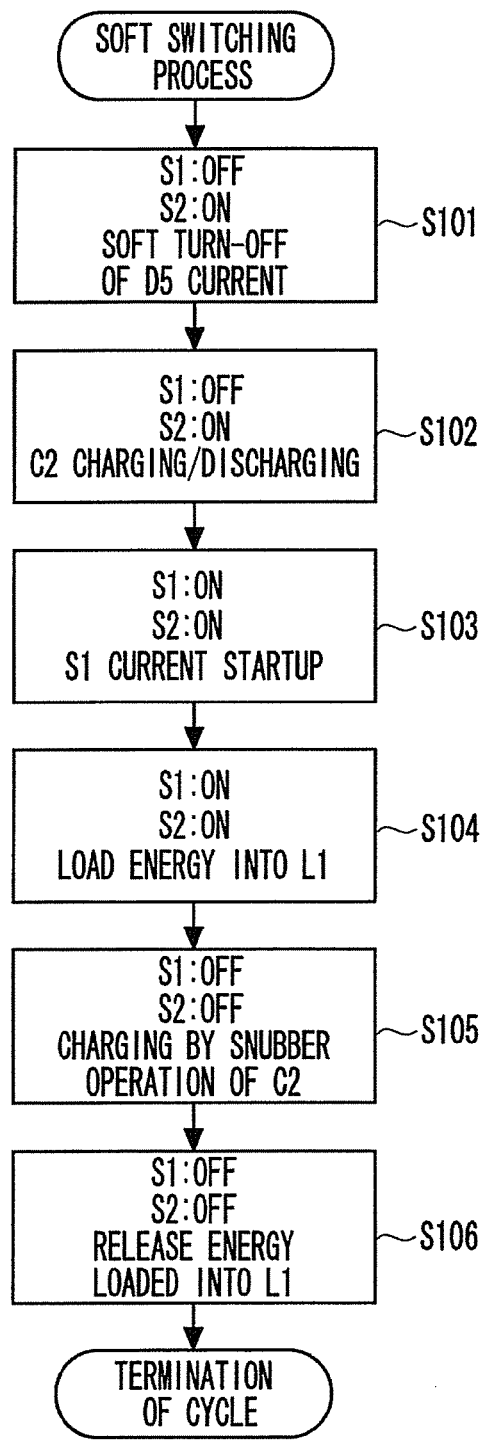
[FIG. 3] A flowchart showing a flow of a soft switching process for boosting the voltage, which conducted by the FC boost converter shown in FIG. 2.

Next, the soft switching of the FC boost converter 12 will be discussed based on FIGS. 3 and 4A through 4F. FIG. 3 is a flowchart of a one-cycle process (which will hereinafter be referred to as a "soft switching process") for the boosting of the FC boost converter 12 via the soft switching operation. In the soft switching process, the ECU 20 sequentially executes respective processes in S101 through S106 to thereby organize one cycle, in which flow modes of the current and the voltage in the FC boost converter 12 are expressed by a mode 1 to a mode 6, and FIGS. 4A through 4F show states thereof. The soft switching process of the FC boost converter 12 will hereinafter be described based on these drawings. Incidentally, FIGS. 4A through 4F omit the description of reference numerals of the main boost circuit 12a and the auxiliary circuit 12b for simplifying the illustrations in the drawings, however, there is a case of quoting the respective circuits in the explanations of the individual modes. Further, what is indicated by a bold arrowhead implies the current flowing across the circuit.

Note that an initial state in which the soft switching process shown in FIG. 3 is executed is a state where the inverter 15 and the motor 16 are supplied with the power from the fuel cell 11, i.e., a state where the current flows toward the inverter 15 via the coil L1 and the diode D5 by turning OFF both of the switching elements S1 and S2. Accordingly, upon termination of one cycle of the soft switching process, it follows that the operation reaches the state equal to the initial state.

Figure 4A:
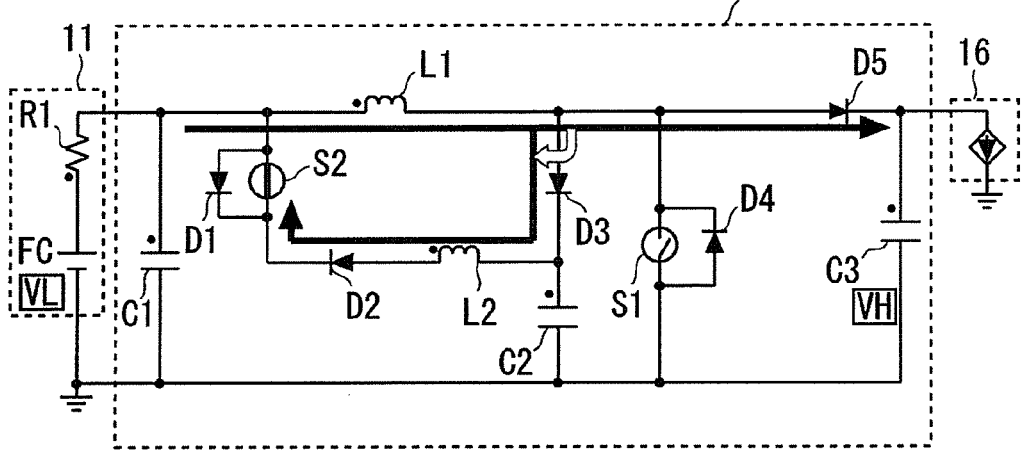
[FIG. 4A] A diagram schematically showing a flow of current in the FC boost converter when performing an operation of a mode 1 in the soft switching process shown in FIG. 3.

In the soft switching process, to begin with, the current/voltage state of the mode 1 illustrated in FIG. 4A occurs in S101. To be specific, the switching element S1 in the turn-OFF state turns ON the switching element S2. With the operation being thus done, the current flowing toward the inverter 15 via the coil L1 and the diode D5 gradually diverts towards the auxiliary circuit 12b due to a potential difference between the outlet port voltage VH and the inlet port voltage VL of the FC boost converter 12. Incidentally, a solid-white arrowhead shows a state of how the current diverts in FIG. 4A.

Figure 4B:
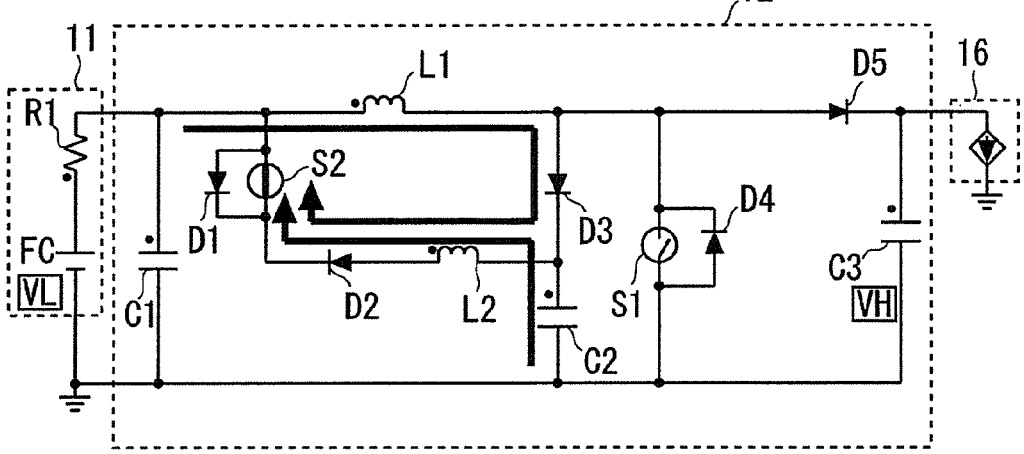
[FIG. 4B] A diagram schematically showing the flow of current in the FC boost converter when performing an operation of a mode 2 in the soft switching process shown in FIG. 3.

Next, in S102, if the state in S101 continues for a predetermined period of time, the current flowing across the diode D5 becomes zero, and, instead, the electric charge accumulated in the snubber capacitor C2 flows in on the side of the auxiliary circuit 12b due to the potential difference between the voltage of the snubber capacitor C2 and the voltage VL of the fuel cell 11 (a state of the mode 2 shown in FIG. 4B). The snubber capacitor C2 has a function of determining the voltage applied to the switching element S1. The electric charge of the snubber capacitor C2, which affects the voltage applied to the switching element S1 when tuning OFF the switching element 51, flows in the auxiliary circuit 12b in the mode 2, with the result that the voltage applied to the snubber capacitor C2 decreases. At this time, the current continues to flow till the voltage of the snubber capacitor C2 reaches zero due to a half-wave resonance between the coil L2 and the snubber capacitor C2. As a result, the applied voltage can be decreased when turning ON the switching element S1 in S103 that will be explained later on.

Figure 4C:
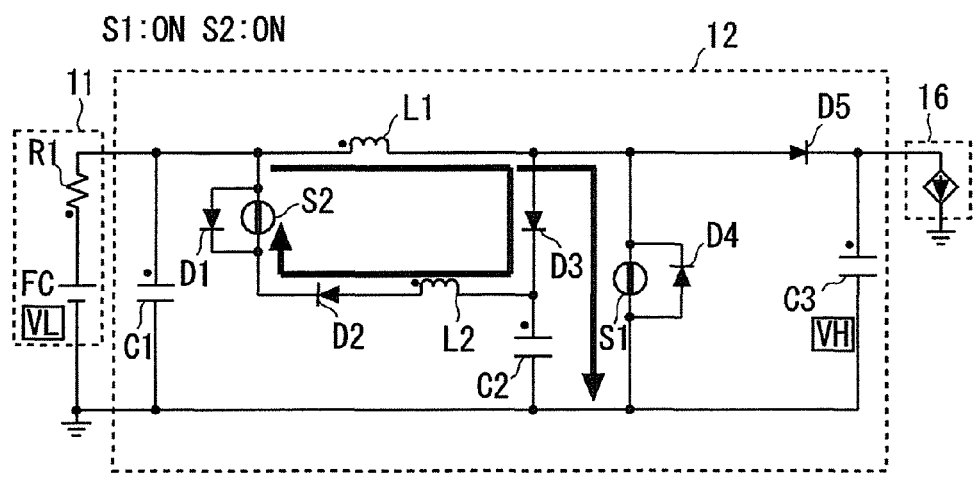
[FIG. 4C] A diagram schematically showing the flow of current in the FC boost converter when performing an operation of a mode 3 in the soft switching process shown in FIG. 3.
Figure 4D:
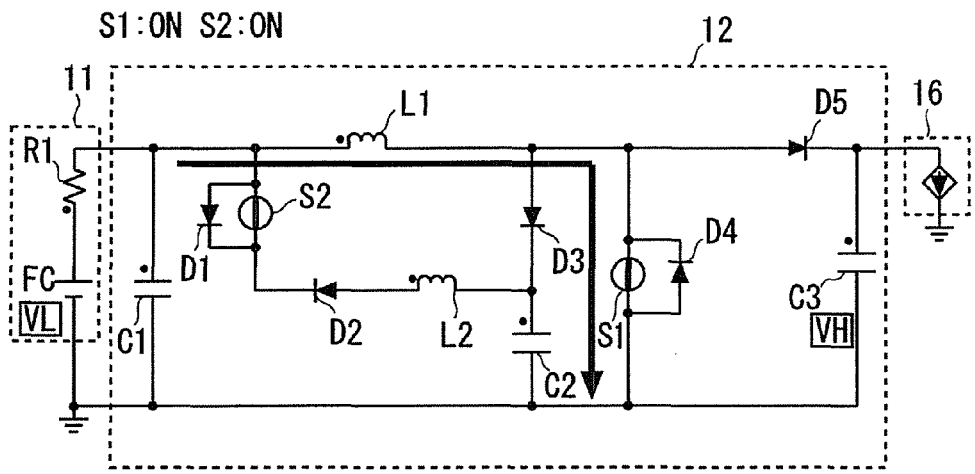
[FIG. 4D] A diagram schematically showing the flow of current in the FC boost converter when performing an operation of a mode 4 in the soft switching process shown in FIG. 3.
Figure 4E:
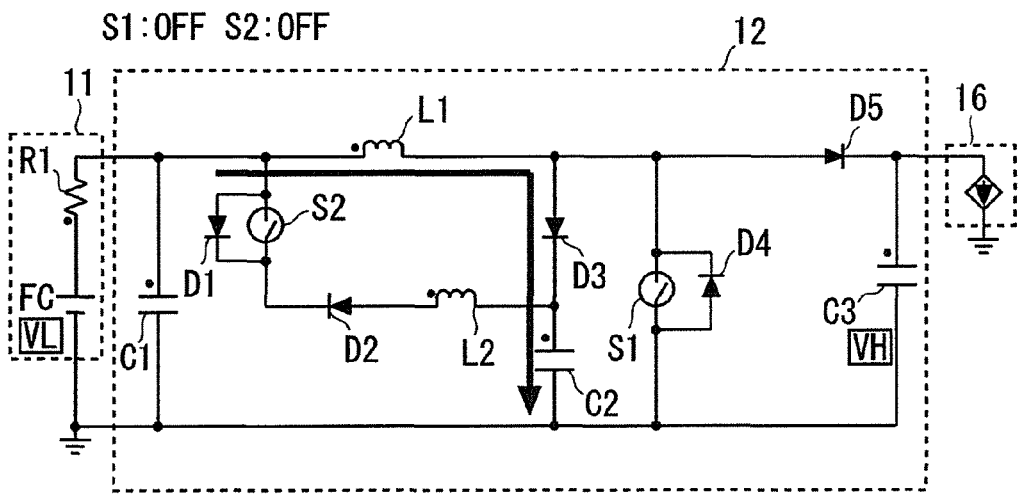
[FIG. 4E] A diagram schematically showing the flow of current in the FC boost converter when performing an operation of a mode 5 in the soft switching process shown in FIG. 3.
Figure 4F:
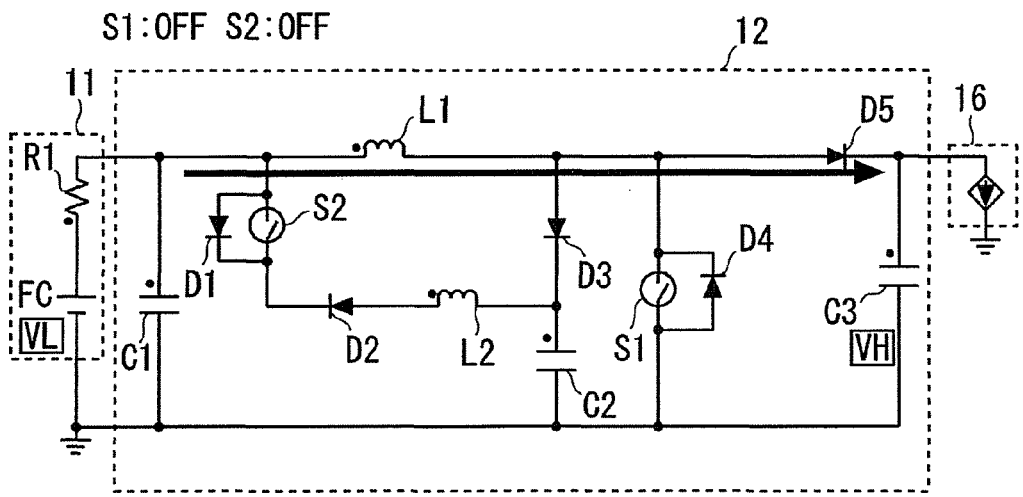
[FIG. 4F] A diagram schematically showing the flow of current in the FC boost converter when performing an operation of a mode 6 in the soft switching process shown in FIG. 3.

Furthermore, in S103, when the electric charge of the snubber capacitor C2 is dissipated completely, the switching element S1 is further turned ON, and the current/voltage state in the mode 3 shown in FIG. 4C occurs. Namely, in the state where the voltage of the snubber capacitor C2 becomes zero, the voltage applied to the switching element S1 also comes to zero, and, after setting the switching element S1 in the zero-voltage state by, then, turning ON the switching element S1 in that state, the switching loss in the switching element S1 can be set theoretically to zero because of the current starting flowing there.

Then, in S104, with the continuation of the state in S103, a quantity of the current flowing in the coil L1 is augmented to thereby gradually increase the energy accumulated in the coil L1. This state is the current/voltage state of the mode 4 illustrated in FIG. 4D. Thereafter, when the desired energy is accumulated in the coil L1, in S105, the switching elements S1 and S2 are turned OFF. Then, the snubber capacitor C2, which has become the low voltage state with the electric charge being dissipated in the mode 2, is charged with the electric charge and reaches the same voltage as the outlet port voltage VH of the FC boost converter 12. This state is the current/voltage state of the mode 5 shown in FIG. 4E. Then, when the snubber capacitor C2 is charged with the electricity up to the voltage VH, the energy accumulated in the coil L1 in S106 is released toward the inverter 15. This state is the current/voltage state of the mode 6 shown in FIG. 4F. Incidentally, when the mode 5 is carried out, a startup of the voltage applied to the switching element S1 is delayed by the snubber capacitor C2, whereby the switching loss due to a tail current in the switching element 51 can be reduced to a greater degree.

As discussed above, the switching loss in the FC boost converter 12 is restrained to the greatest possible degree by executing the soft switching process of which one cycle is organized by the processes in S101 through S106, and thereafter the output voltage of the fuel cell 11 is boosted and thus can be supplied to the inverter 15. As a result, the motor 16 classified as the high-voltage low-current motor can be efficiently actuated.

Figure 5:
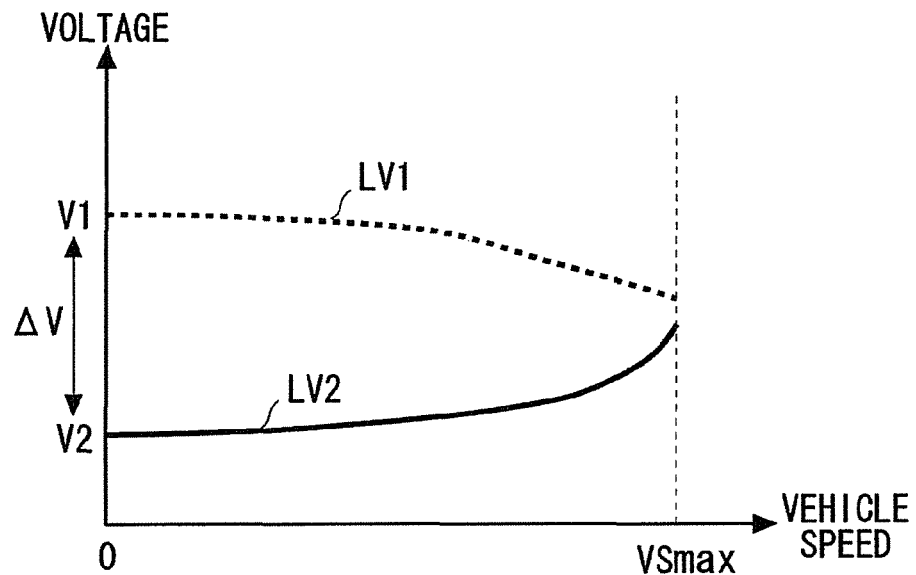
[FIG. 5] A diagram showing a correlation between an output voltage of the fuel cell and a motor necessary voltage for actuating a motor, which are set in a conventional fuel cell system.

Herein, in the fuel cell system 10, in addition to the soft switching process described above, intermittent operation control of the FC boost converter 12 is performed, thereby improving the system efficiency. For simplifying the discussion, when focusing on a relationship between the fuel cell 11, the inverter 15 and the motor 16, the power from the fuel cell 11 serving as the main power source for the motor 16 is supplied to the side of the inverter 15 via the FC boost converter 12. Then, the voltage, which should be applied to the inverter 15 on such an occasion that the fuel cell 11 as the main power source actuates the motor 16, must be the voltage large enough to resist the counter electromotive force of the motor 16. Accordingly, the conventional fuel cell system equipped with none of the FC boost converter 12 must be set in a state where, as illustrated in FIG. 5, in a speed range (0 to VSmax) that can be taken by the vehicle 1, a voltage denoted by LV1, which is applied by the fuel cell 11, always exceeds a voltage that is necessary for actuating the motor and should be applied to the inverter 15 (which will hereinafter be termed a [motor necessary voltage]). For attaining this, the voltage exceeding largely the voltage that should be applied to the inverter is, it follows, applied to the inverter, resulting in the large switching loss of the inverter. Then, in an area where the speed of the vehicle 1 is low, a remarkable switching loss of the inverter might occur.

Herein, in the fuel cell system 10 according to the present invention, because of providing the FC boost converter 12, the voltage from the fuel cell 11 is boosted and thus can be applied to the inverter 15. The boost operation of this FC boost converter 12 undergoes, however, the occurrence of some kind of switching loss due to the switching element and therefore becomes one factor for decreasing the system efficiency. On the other hand, as described above, the motor 16 is the motor based on the high voltage/high current specifications, and the counter electromotive force generated with the rise in the number of revolutions increases, and the boost operation of the FC boost converter 12 is indispensable.

Figure 6:
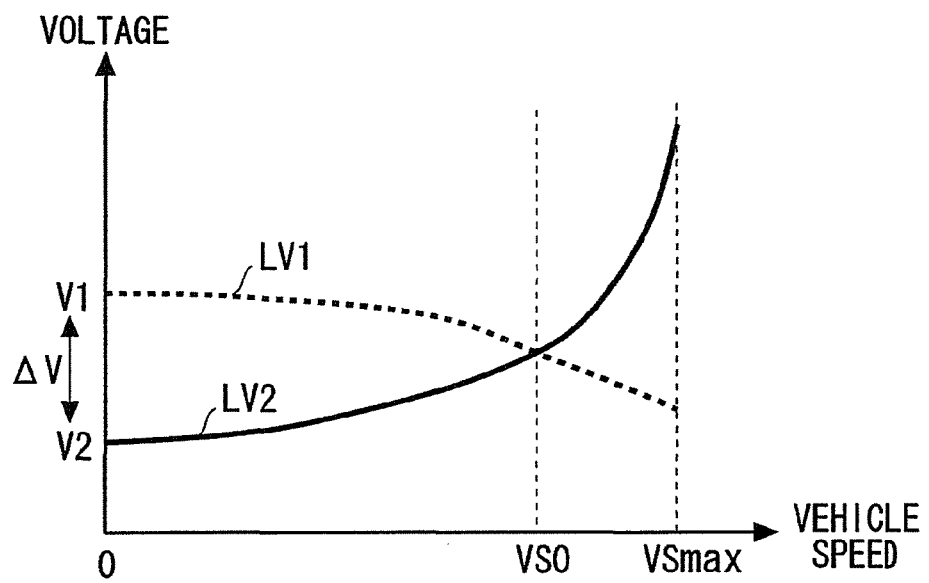
[FIG. 6] A diagram showing a correlation between the output voltage of the fuel cell and the motor necessary voltage for actuating the motor, which are set in the fuel cell system according to the working example of the present invention.

Such being the case, a correlation between the output voltage from the fuel cell 11 and the motor necessary voltage that should be applied to the inverter 15 is expressed by LV1 and LV2 respectively in FIG. 6. As indicated by LV2 in FIG. 6, the counter electromotive force of the motor 16 rises as the speed of the vehicle 1 increases, and hence the motor necessary voltage also rises as the speed of the vehicle increase. Herein, the voltage characteristic of the fuel cell 11 and the voltage characteristic of the motor 16 may be determined so that in the correlation between the output voltage LV1 of the fuel cell 11 and the motor necessary voltage LV2, a speed VS0 of the vehicle 1 when both of the voltages LV1 and LV2 intersect each other becomes a speed at which the user performs substantially the normal operation of the vehicle 1. In the first working example, VS0 is set to 110 km/h from the laws and regulations for driving the vehicle, a tendency of the user's normal operation, etc. Then, a maximum output enabling the vehicle 1 to travel at this speed VS0 when actuating the motor 16 is calculated, and the voltage (the motor necessary voltage), which should be applied to the inverter 15, is derived so as to enable the maximum output to be exhibited. Then, the fuel cell 11 is designed (e.g., a stack cell count is adjusted etc in the fuel cell built up by stacking the plurality of cells) so that the motor necessary voltage can be output directly from the fuel cell 11 without via the FC boost converter 12.

In the fuel cell system 10 including the thus-designed fuel cell 11, during a period till the speed of the vehicle 1 reaches VS0, the output voltage from the fuel cell 11 is higher than the motor necessary voltage for actuating the motor 16, and hence, even when the motor 16 is the motor based on the high voltage/high current specifications, the motor 16 can be actuated by the output voltage directly from the fuel cell 11 without the boost operation of the FC boost converter 12. In other words, under this condition, it follows that the actuation of the motor 16 can be ensured by stopping the switching operation of the FC boost converter 12 and applying the output voltage from the fuel cell 11 to the inverter 15. With this contrivance, the switching loss in the FC boost converter 12 can be completely excluded. Furthermore, the voltage applied to the inverter 15 does not become excessively high due to the stop of the FC boost converter 12, i.e., the voltage difference between LV1 and LV2 can be restrained smaller than in the state illustrated in FIG. 5, and therefore the switching loss in the inverter 15 can be restrained low.

On the other hand, when the vehicle speed of the vehicle 1 becomes equal to or higher than VS0, reversely the motor necessary voltage for actuating the motor 16 is higher than the output voltage from the fuel cell 11, and hence the boost operation of the FC boost converter 12 is required. In this case, the switching loss in the FC boost converter 12 can be restrained to the greatest possible degree by executing the soft switching process described above.

What has been discussed so far puts the focus on only the correlation between the fuel cell 11 and the motor 16 for the simplicity of the explanation, however, as illustrated in FIG. 1, in the fuel cell system 10, the motor 16 can be supplied with the electric power from the battery 13. In the case of being supplied with the electric power from the battery 13, the output voltage from the battery 13 is boosted by the battery boost converter 14 and is thereafter applied to the inverter 15. Herein, the battery boost converter 14 is the so-called boost converter, and hence the voltage must be set in the same or higher state as or than the outlet port voltage of the battery boost converter 14 (which is the voltage on the side of the inverter 15 and is equal to the outlet port voltage of the FC boost converter 12) in order to supply the power to the inverter 15 from the battery 13.

Figure 7A:
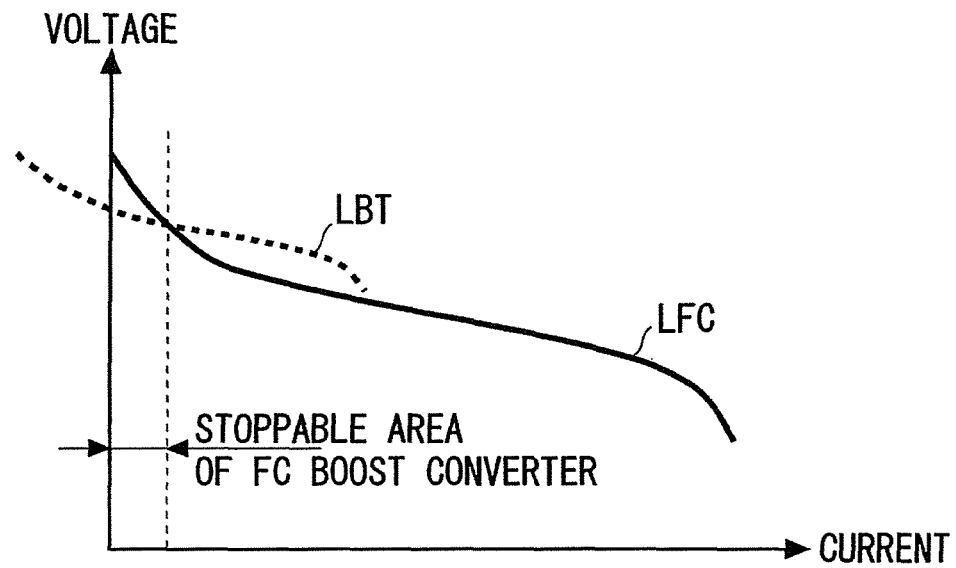
[FIG. 7A] A first diagram showing a correlation between an IV characteristic of the fuel cell and an IV characteristic of the battery, which are set in the fuel cell system according to the working example of the present invention.
Figure 7B:
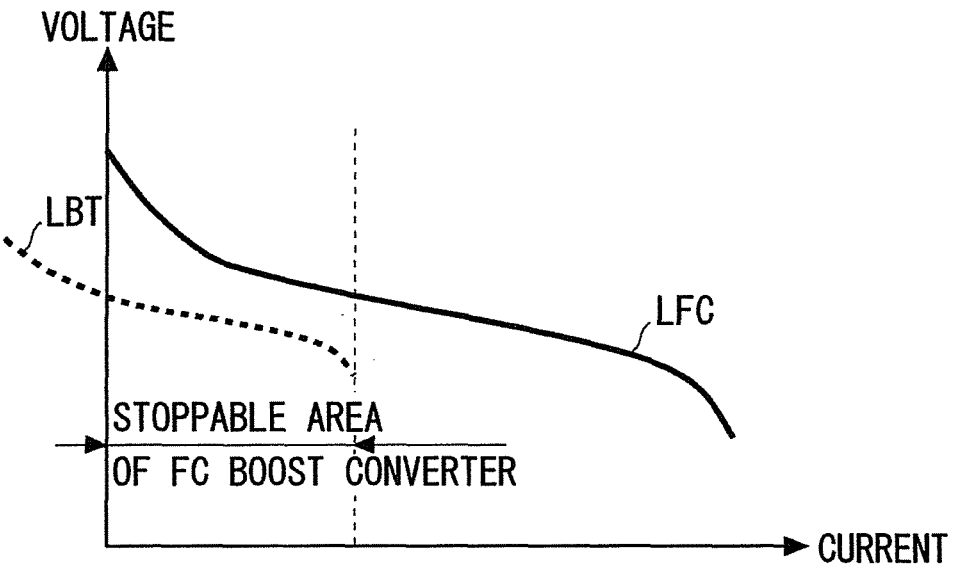
[FIG. 7B] A second diagram showing the correlation between the IV characteristic of the fuel cell and the IV characteristic of the battery, which are set in the fuel cell system according to the working example of the present invention.

This being the case, the correlation between the output voltage of the battery 13 and the output voltage of the fuel cell 11 will be explained based on FIGS. 7A and 7B. Both of FIGS. 7A and 7B show an IV characteristic (indicated by a solid line LBT in the drawings) of the battery 13 and the IV characteristic (indicated by a solid line LFC in the drawings) of the fuel cell 11. Herein, in FIG. 7A, in an area where the IV characteristic LFC of the fuel cell 11 is higher than the IV characteristic LBT of the battery 13, the output voltage of the battery 13 reaches a state of being lower than the output voltage of the FC boost converter 12 even by stopping the FC boost converter 12, so that the battery boost converter 14 gets capable of performing the boost operation, whereby the motor 16 can be supplied with the electric power from the battery 13. Accordingly, in this state, the stop of the operation of the FC boost converter 12 is permitted. On the other hand, in an area where the IV characteristic LBT of the battery 13 is higher than the IV characteristic LFC of the fuel cell 11, if the FC boost converter 12 is stopped, the output voltage of the battery 13 reaches a state of being higher than the output voltage of the FC boost converter 12, and it is therefore impossible to control a distribution of the outputs of the fuel cell 11 and the battery 13 through the boost operation of the battery boost converter 14. Accordingly, in this state, the stop of the operation of the FC boost converter 12 is not permitted.

Namely, the battery boost converter 14 boosts the output voltage from the battery 13, and the voltage is applied to the motor 16, in which case there is a necessity for generating the state where the output port voltage of the FC boost converter 12 is higher than the output voltage of the battery 13 (the inlet port voltage of the battery boost converter 14) and there is also a case where the stop of the operation of the FC boost converter 12 is not consequently permitted. For example, as illustrated in FIG. 7A, if the IV characteristic LFC of the fuel cell 11 is lower than the IV characteristic LET of the battery 13 in the comparatively low current area, the stop of the operation of the FC boost converter 12 is not permitted for ensuring the boost operation of the battery boost converter 14, and, as a result, there decreases the possibility of scheming to reduce the switching loss. While on the other hand, for instance, as illustrated in FIG. 7B, if the IV characteristic LFC of the fuel cell 11 is always higher than the IV characteristic LET of the battery 13, it does not happen that the stop of the operation of the FC boost converter 12 is restricted in terms of ensuring the boost operation of the battery boost converter 14.

The restriction of the operation of the FC boost converter 12 with respect to ensuring the boost operation of the battery boost converter 14, which has been discussed so far, is attributable to the point that the battery boost converter 14 included in the fuel cell system 10 illustrated in FIG. 1 is the boost type converter (i.e., the converter incapable of performing buck operation (depressurization)) Accordingly, in the fuel cell system 10, in the case of adopting the buck-boost converter capable of performing the boost operation and the buck operation in place of the battery boost converter 14, the FC boost converter 12 can selectively apply the output voltages from the fuel cell 11 and the battery 13 to the motor 16 without being bounded to the operational restriction described above.

Figure 8A:
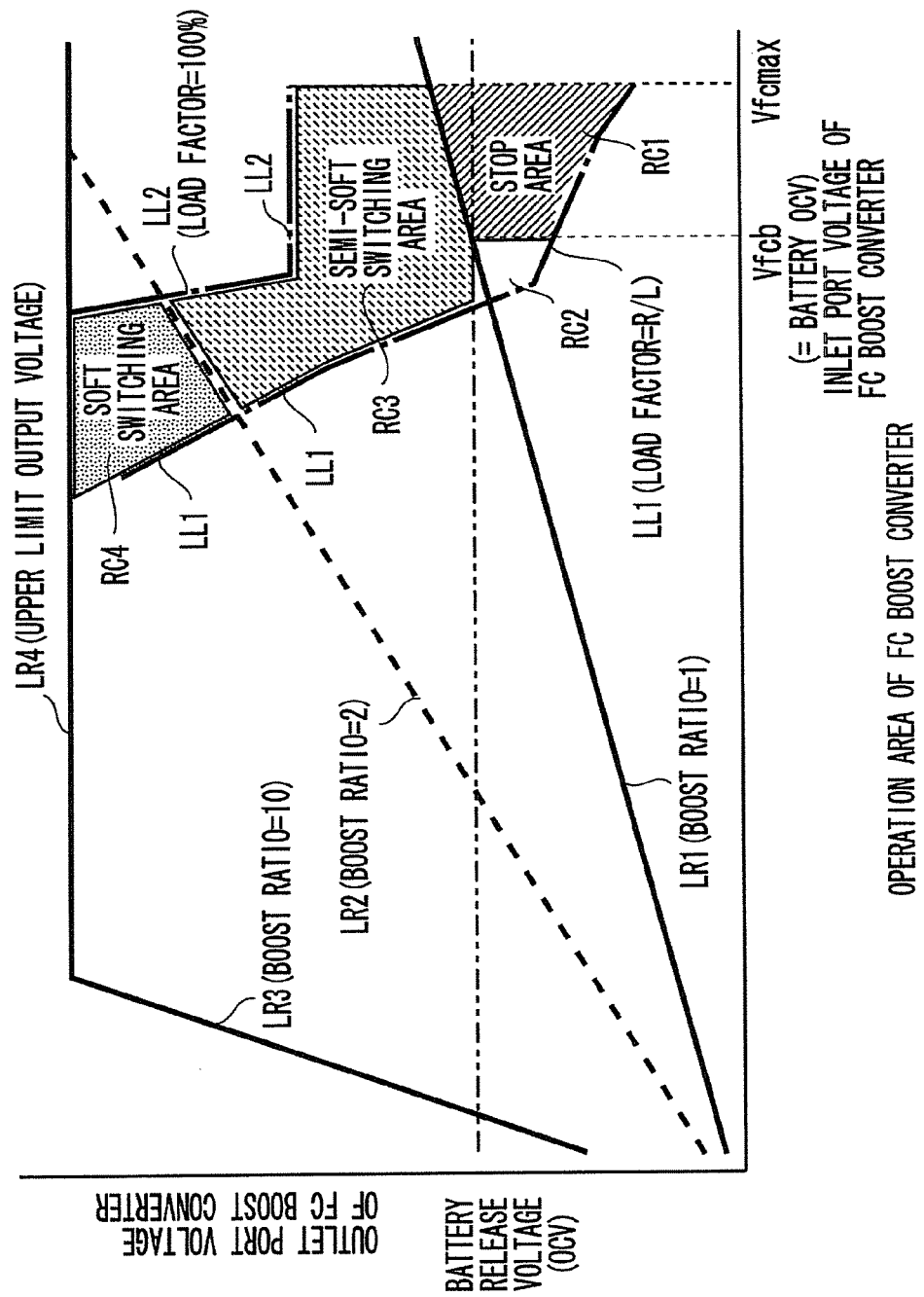
[FIG. 8A] A first map showing a process executed by the FC boost converter in a way that associates the process with an operation area formed by giving an inlet port voltage of the FC boost converter along the axis of abscissa and an outlet port voltage thereof along the axis of ordinates in the fuel cell according to the working example of the present invention.

From what has been discussed above, in the first working example, the IV characteristic of the battery 13 and the IV characteristic of the fuel cell 11, which are needed for the assumed drive of the vehicle 1, are determined, and the control area for the boost operation of the FC boost converter 12 as shown in maps of FIGS. 8A and 8B is defined from the correlation between the two IV characteristics and the relation between the output voltage of the fuel cell 11 and the motor necessary voltage. The following is an in-depth description of the boost operation of the FC boost converter 12.

FIGS. 8A and 8B are the maps in which the processes executed in the FC boost converter 12 are displayed in the way of being related to operation areas formed by giving the inlet port voltage of the FC boost converter 12 along the axis of abscissa and the outlet port voltage thereof along the axis of ordinates. Note that FIG. 8A is the map formed when the battery boost converter 14 included in the fuel cell system 10 is the boost type converter, and FIG. 8B is the map formed when adopting the buck-boost converter in place of the boost type battery boost converter 14. To start with, the map illustrated in FIG. 8A will be described. Herein, the map shows a rectilinear line LR1 signifying that a boost ratio of the FC boost converter 12 is 1, i.e., that the ratio of the inlet port voltage to the outlet port voltage is 1:1, a rectilinear line LR2 signifying that the boost ratio takes a value in the vicinity of 2 (simply, [2] is given as the boost ratio in the drawings), a rectilinear line LR3 signifying that the boost ratio is 10, and a rectilinear line LR4 signifying the maximum output voltage of the FC boost converter 12. The rectilinear line LR2 will hereinafter be described based on FIGS. 9, 10A and 10B. Further, the rectilinear line LR3 represents the maximum boost ratio of the FC boost converter 12. Accordingly, it is recognized that the operation range of the FC boost converter 12 is an area circumscribed by the rectilinear lines LR1, LR3 and LR4.

Herein, in an assumed speed range of the vehicle 1, a one-dotted chain line LL1 represents a relation between the inlet port voltage and the outlet port voltage of the FC boost converter 12 in the case where the load applied to the motor 16 is lowest, i.e., the, load substantially corresponding to a frictional resistance on the road (which is given by the load factor=R/L (Road Load)) is applied to the motor 16. On the other hand, similarly in the assumed speed range of the vehicle 1, a one-dotted chain line LL2 represents a relation between the inlet port voltage and the outlet port voltage of the FC boost converter 12 in the case where the load applied to the motor 16 is highest, i.e., the accelerator opening degree of the vehicle 1 is 100% (the load factor=100% given in FIGS. 8A, 8B). Accordingly, it follows that the fuel cell system 10 mounted in the vehicle 1 makes the FC boost converter 12 perform the boost operation indicated by the area circumscribed by the one-dotted chain lines LL1 and LL2 in terms of driving the vehicle 1.

In the map illustrated in FIG. 8A, the operation area of the FC boost converter 12 is segmented into four segment areas RC1-RC 4. In these areas, characteristic operations of the operation of the FC boost converter 12 are carried out, and the operation of the FC boost converter 12 in each segment area will hereinafter be described. To begin with, the area RC1 is defined as the area under the rectilinear line LR1 representing the boost ratio 1. In this area RC1, the boost ratio needed for actuating the motor 16 is equal to or smaller than 1 (It should be noted that in fact, the boost ratio is set equal to or smaller than 1, i.e., the buck operation (depressurization) can not be done because of the FC boost converter 12 being classified as the boost converter.), and hence the output voltage of the fuel cell 11 can be resultantly applied directly to the inverter 15 in a way that stops the FC boost converter 12. Then, the boost operation of the FC boost converter 12 is completely stopped in the range where the output voltage, serving as the inlet port voltage of the FC boost converter 12, of the fuel cell 11 is between the maximum voltage Vfcmax of the fuel cell 11 and Vfcb taking the same value as that of an open circuit voltage (OCV) of the battery 13 and in the area RC1 defined in the way of being circumscribed by the rectilinear line LR1 and the one-dotted chain line LL1. This stoppage can restrain the switching loss in the FC boost converter 12. Thus, it is because the battery boost converter 14 is, as stated above, the boost type converter and the boost operation thereof is ensured that the operation stop of the FC boost converter 12 undergoes the restraint at the boundary of the voltage Vfcb.

Next, the area R2 will be described. This area RC2 is defined as an area where the inlet port voltage of the FC boost converter 12 is equal to or smaller than Vfcb and the outlet port voltage of the FC boost converter 12 is equal to or smaller than OCV of the battery 13, i.e., this outlet port voltage is equal to or smaller than the voltage taking the same value of Vfcb. Namely, the area RC2 is the area where if the boost operation of the FC boost converter 12 is not conducted, the outlet port voltage of the battery boost converter 14 becomes lower than the inlet port voltage with the result that the boost operation of the battery boost converter 14 can not be performed, and is also the area where even if the boost operation of the FC boost converter 12 is conducted, the boost operation of the battery boost converter 14 can not be conducted similarly because the boost ratio thereof is low.

In the thus-defined area RC2, similarly to the area RC1, the switching loss is not caused by stopping the FC boost converter 12. Then, the terminal voltage of the fuel cell 11 is controlled down to the lowest voltage controllable by the battery boost converter 14. Note that Vfcb in the drawings is set on the assumption that in the case of using the idealistic boost converter, the voltage thereof is equal to OCV. This state continues as far as the discharge power of the battery 13 permits.

It is to be noted that this area RC2 is a transient area via which the operation area of the FC boost converter 12 transitions to the area RC that will be described later on from the area RC1 described above during the transition of the actuation state of the motor 16. Accordingly, if the battery boost converter 14 is the boost type converter, the correlation between the IV characteristic of the fuel cell 11 and the IV characteristic of the battery 13, which have been described based on FIGS. 7A and 7B are, it is preferable, properly adjusted so that this transient area RC2 is reduced to the greatest possible degree.

Herein, the map illustrated in FIG. 8B, i.e., the map formed when the fuel cell system 10 adopts the buck-boost converter in place of the battery boost converter 14 in the area under the rectilinear line LR1, will be explained. In this case, the output voltage of the battery 13 can be stepped down by the buck-boost converter, and therefore, as described above, the operation stop of the FC boost converter 12 undergoes none of the restraint of the voltage Vfcb. Accordingly, as shown in FIG. 8B, in the area under the rectilinear line LR1, the improvement of the system efficiency is facilitated without restraint of the operation of the FC boost converter 12. Accordingly, as a result, it follows that the area corresponding to the area RC2 does not exist in FIG. 8B. Herein, the descriptions of the maps that will be given as below are applied in common to FIGS. 8A and 8B and therefore made en bloc.

In the operation area other than the areas RC1, RC2 described so far, the boost operation of the output voltage of the fuel cell 11 is carried out by actuating the FC boost converter 12. In this boost operation, the soft switching process explained based on FIGS. 4A-4F is executed, and the switching loss in the FC boost converter 12 is restrained to the greatest possible degree. Herein, the operation area where the soft switching process is executed is segmented by the rectilinear line LR2 into the semi-soft switching area RC3 and the soft switching area RC4. The semi-soft switching area RC3 and the soft switching area RC4 will be described in detail.

To start with, a technical significance of the rectilinear line LR2 will be explained. As described above, the rectilinear line LR2 is the rectilinear line signifying that the boost ratio of the FC boost converter 12 takes the value in the vicinity of 2. An electrical structure of the FC boost converter 12 according to the present invention is as illustrated in FIG. 2, however, in the operation of the mode 2 in a series of flows of the soft switching process described above, the snubber capacitor C2 is discharged by utilizing the half-wave resonance involving the use of the coil L2 of the auxiliary circuit 12b and the snubber capacitor C2. In the operation of the mode 2, when extracting only the actually working elements within the FC boost converter 12, a circuit configuration becomes as depicted in FIG. 9.

Figure 9:
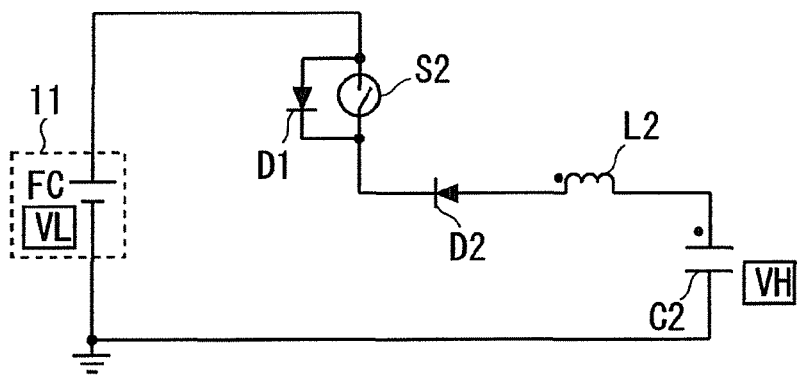
[FIG. 9] A diagram showing an extraction of only actually working portions within the FC boost converter for the explanation's sake when performing the operation of the mode 2 in the soft switching process shown in FIG. 3.

Then, in the circuit configuration illustrated in FIG. 9, unless the electric charge charged in the snubber capacitor C2 is completely discharged, the current caused due to the turn-ON of the switching element S1 flows in the state where the voltage is applied to the switching element S1 in the operation of the subsequent mode 3, resulting in the occurrence of the switching loss. Accordingly, it is important to completely discharge, it is understood, the electric charge of the snubber capacitor C2 in this mode 2, however, for attaining this discharge, the energy accumulated in the coil L2 must be larger than the energy accumulated in the snubber capacitor C2 at the point of the operation of the mode 1. In other words, the outlet port voltage VH of the FC boost converter 12 must be higher by a predetermined quantity or above than the inlet port voltage VL thereof.

Figure 10A:
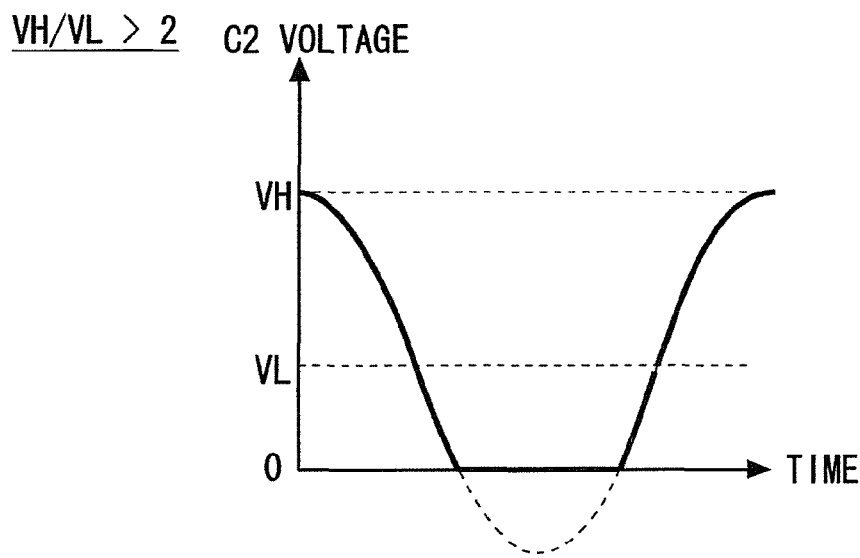
[FIG. 10A] A first diagram illustrating a correlation between a ratio VH/VL between the outlet port voltage of the FC boost converter according to the working example of the present invention and the inlet port voltage thereof, and a residual voltage in the snubber capacitor when discharged in the case of performing the operation of the mode 2 of the soft switching process shown in FIG. 3.
Figure 10B:
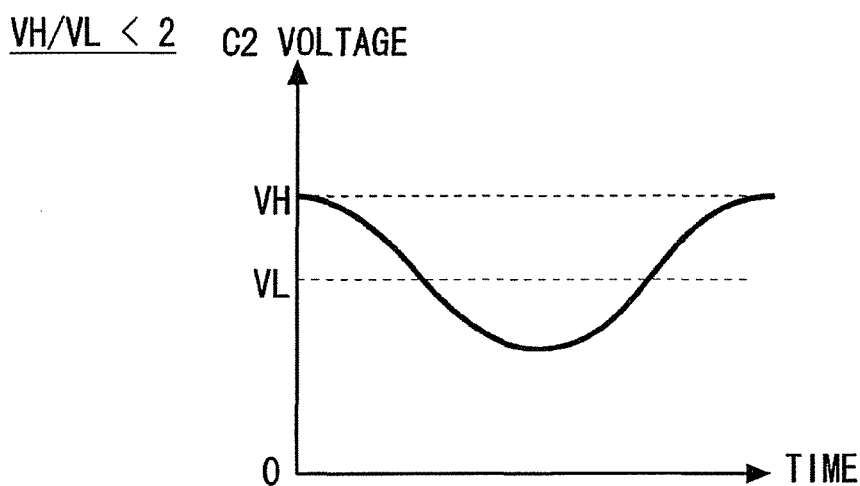

Such being the case, a relation between an outlet port voltage/inlet port voltage ratio VH/VL and a residual voltage in the snubber capacitor C2 will be explained based on FIGS. 10A and 10B. Note that FIG. 10A shows a transition of the voltage of the snubber capacitor C2 if the ratio VH/VL exceeds 2, and FIG. 10B shows the transition of the voltage of the snubber capacitor C2 if the ratio VH/VL is less than 2. In the case illustrated in FIG. 10A, the value of VH-VL is larger than VL, and hence, if the half-wave resonance occurs, the voltage of the snubber capacitor C2 becomes to zero with the action of the diode D2. On the other hand, in the case illustrated in FIG. 10B, the value of VH-VL is smaller than VL, and therefore it follows that even when the half-wave resonance occurs, the voltage of the snubber capacitor C2 is left by a fixed value or more. Accordingly, even when the soft switching process is executed in such a case, it follows that the switching loss is produced. From what has been discussed so far, it follows that the rectilinear line LR2 exists as a criterion for determining whether the switching loss due to the soft switching process is effectively restrained or not.

It should be noted that if the ratio VH/VL is theoretically twice or more, the voltage of the snubber capacitor C2 after being discharged comes to zero, however, the ratio VH/VL takes a value (e.g., 2.3 etc) over the 2-fold value because the energy loss actually occurs in the diode and within the wiring. Then, in the operation area circumscribed by the one-dotted chain lines LL1 and LL2, the area excluding the segment areas RC1, RC2 is segmented by the rectilinear line LR2 into two areas, in which the area positioned under the rectilinear line LR2 is set as the semi-soft switching area RC3 where the switching loss is hard to be efficiently restrained even by executing the soft switching process for the reason elucidated above, while the area positioned above the rectilinear line LR2 is set as the soft switching area RC4 where the switching loss is efficiently restrained in the soft switching process.

Thus, the operation area of the FC boost converter 12 can be divided into the predetermined areas RC1-RC4, however, in the semi-soft switching area RC3, as discussed above, the switching loss of the FC boost converter 12 can not be sufficiently restrained, and hence it is preferable in terms of the efficiency of the fuel cell system 10 that the execution of the boost operation of the FC boost converter 12 is avoided to the greatest possible degree. This being the case, one example of the control of the FC boost converter 12 in order to accelerate the efficiency of the fuel cell system 10 will be described based on FIG. 11A. The control of the FC boost converter is executed by the ECU 20 when the motor 16 is supplied with the electric power generated by the fuel cell 11. Incidentally, it is, as described above, preferable that the boost operation in the semi-soft switching area RC3 is avoided to the greatest possible degree for attaining the much higher efficiency of the fuel cell system 10, however, the fuel cell system 10 according to the present invention does not completely exclude the boost operation but may utilize the boost operation as the necessity may arise.

To begin with, in S201, maximum torque enabling the motor 16 to generate the maximum output is calculated, which corresponds to the actual number of revolutions of the motor 16 that is detected by the encoder. To be specific, the ECU 20 has a map in which the number of revolutions of the motor 16 is associated the maximum torque corresponding thereto, and the maximum torque of the motor 16 is calculated in a way that accesses this map according to the detected number of revolutions. Upon an end of the process in S201, the operation proceeds to S202.

In S202, a request torque, of which the output is requested of the motor 16, is calculated based on the opening degree of the accelerator pedal, which is detected by the accelerator pedal sensor 21. If it is defined that a full opening degree of the accelerator pedal requests the maximum torque in the number of revolutions of the motor 16 at the present point of time, the request torque is calculated according to the following formula, where a coefficient when in the full opening degree is 100%, while the coefficient when in a full closing degree is 0%. Upon the end of the process in S202, the operation proceeds to S203.

(Request Torque)=(Maximum Torque)×(Coefficient Corresponding to Opening Degree of Accelerator Pedal)

In S203, the request output defined as the output requested of the motor 16 is calculated, based on the calculation results in S201 and S202, according to the following formula. Upon the end of the process in S203, the operation proceeds to S204.

(Request Output)=(Request Torque)×(Number of Revolutions of Motor)

In S204, a motor necessary voltage (Vmot) defined as the voltage that should be applied to the inverter 15 is calculated based on the request output calculated in S203 and the number of revolutions of the motor 16. Specifically, the ECU 20 has a motor necessary voltage map in which a function F generated by the number of revolutions (rpm) of the motor 16 and the request output (P) is associated with the motor necessary voltage, and the motor necessary voltage is calculated in a way that accesses this map according to the number of revolutions of the motor and the request output. The motor necessary voltage map can be previously determined from an experiment etc, and one example of this map is that the request voltage value should increase because the counter electromotive force (voltage) rises with the higher number of revolutions of the motor 16 and therefore also should increase in order to attain the output thereof with a less quantity of current when the request output rises, and hence these points are reflected in the correlation between the function F and the motor necessary voltage. Upon the end of the process in S204, the operation proceeds to S205.

In S205, an output voltage (Vfc) of the fuel cell 11 generating the electricity is detected based on the opening degree of the accelerator pedal, which is detected by the accelerator pedal sensor 21. This detection is conducted via an unillustrated voltage sensor. Upon the end of the process in S205, the operation proceeds to S206. In S206, a temporary boost ratio Rt (=Vmot/Vfc) is calculated by dividing the motor necessary voltage calculated in S204 by the output voltage of the fuel cell 11 that is detected in S205. Upon the end of the process in S206, the operation proceeds to S207.

In S207, it is determined whether the FC boost converter 12 can be stopped or not. Namely, it is determined which area, RC1 or RC1, to which the operation area of the FC boost converter 12 belongs. To be specific, if the temporary boost ratio calculated in S206 is less than 1 and if the output voltage of the fuel cell 11 is between Vfcmax and Vfcb, the operation area of the FC boost converter 12 is determined to be RC1; and, if the output voltage of the FC boost converter 12 is equal to or smaller than Vfcb and if the outlet port voltage of the FC boost converter 12 is equal to or smaller than the voltage taking the same value as Vfcb, the operation area of the FC boost converter 12 is determined to be RC2. Note that the values of Vfcb and Vfcmax may be determined beforehand according to the actual specifications of the fuel cell 11 and the battery 13. Moreover, the outlet port voltage of the FC boost converter 12 is detected via an unillustrated voltage sensor.

Then, if determined to be affirmative in S207, the operation proceeds to S208, in which the FC boost converter 12 is stopped, and the output voltage from the fuel cell 11 is applied directly to the inverter 15. With this contrivance, the switching loss in the FC boost converter 12 can be restrained. Note that as described above, if the operation area of the FC boost converter 12 belongs to RC1, the voltage can be applied to the inverter 15 from the battery 13 after being boosted, however, if the operation area belongs to RC2, the terminal voltage of the fuel cell 11 is controlled down to the lowest voltage controllable by the battery boost converter 14. Whereas if determined to be negative in S207, the operation proceeds to S209.

In S209, it is determined whether the temporary boost ratio Rt calculated in S206 exceeds 2 or not. Namely, it is determined which area, the soft switching area RC4 or the semi-soft switching area RC3, the operation area of the FC boost converter 12 is positioned in. If determined to be affirmative in S209, this implies that the operation area of the FC boost converter 12 exists in the soft switching area RC4, the operation proceeds to S210, in which the soft switching process shown in FIG. 3 is executed so that the target output voltage of the FC boost converter 12 becomes the motor necessary voltage Vmot. Incidentally, the duty ratio of the switching element S1 is determined based on the temporary boost ratio Rt. Whereas if determined to be negative in S209, this implies that the operation area of the FC boost converter 12 exists in the semi-soft switching area RC3. Then, in this case, the operation proceeds to S211.

In S211, in the fuel cell system 10, in addition to the voltage boost based on the temporary boost ratio Rt calculated in S206, it is determined whether or not a further additional voltage boost (which will hereinafter be simply termed the [additional voltage boost]) is permitted. In other words, the negative determination in S209 connotes that the operation area of the FC boost converter 12 exists in the semi-soft switching area RC3 at the present point of time, and hence it is determined whether or not the operation area can transition to the soft switching area RC4. Namely, when performing the additional voltage boost for making the operation area transition to the soft switching area RC4 from the semi-soft switching area RC3, the voltage applied to the inverter 15 gets higher than the motor necessary voltage. As a result, though the switching loss in the inverter 15 increases, when the decrement of the switching loss of the FC boost converter 12 is compared with the increment of the switching loss of the inverter 15, there might be a case where the former decrement is larger, in which case this additional voltage boost is extremely useful in terms of the system efficiency. Then, it is determined in S211 whether the additional voltage boost is permitted or not. If determined to be affirmative in S211, the operation proceeds to S212, in which an additional boost ratio Ra for the additional voltage boost is determined. This additional boost ratio Ra is an additional boost ratio needed for getting the final boost ratio (given by Rt×Ra) of the FC boost converter 12 to exceed the boost ratio (e.g., the boost ratio "2") determined by the rectilinear line LR2. Then, after the process in S212, the operation proceeds to S213, in which the soft switching process shown in FIG. 3 is executed so that the target output voltage of the FC boost converter 12 becomes the voltage calculated by multiplying the output voltage Vfc of the fuel cell 11 by the boost ratio Rt and the additional boost ratio Ra. Note that the duty ratio of the switching element S1 is determined based on a product of the temporary boost ratio Rt and the additional boost ratio Ra.

Thus, at the point of time when determined to be negative in S209, the operation area of the FC boost converter 12 is originally the semi-soft switching area RC3, and, even when executing the soft switching process in that state, as described above, it is difficult to sufficiently restrain the switching loss. In this case, the boost ratio of the FC boost converter 12 takes account of the additional boost ratio Ra, whereby the operation area of the FC boost converter 12 is set to the soft switching area RC4 by further increasing the voltage over the voltage originally needed for actuating the motor 16. As a result, the switching loss can be effectively restrained.

Whereas if determined to be negative in S211, the operation proceeds to S214, in which the soft switching process is executed in the state where the operation area of the FC boost converter 12 is RC3. When the fuel cell 11 is in the state that does not permit the additional voltage boost, i.e., in the state where the switching loss in the inverter 15 becomes remarkable by additionally boosting the voltage as described above, the processes in S212 and S213 are not executed.

Figure 11A:
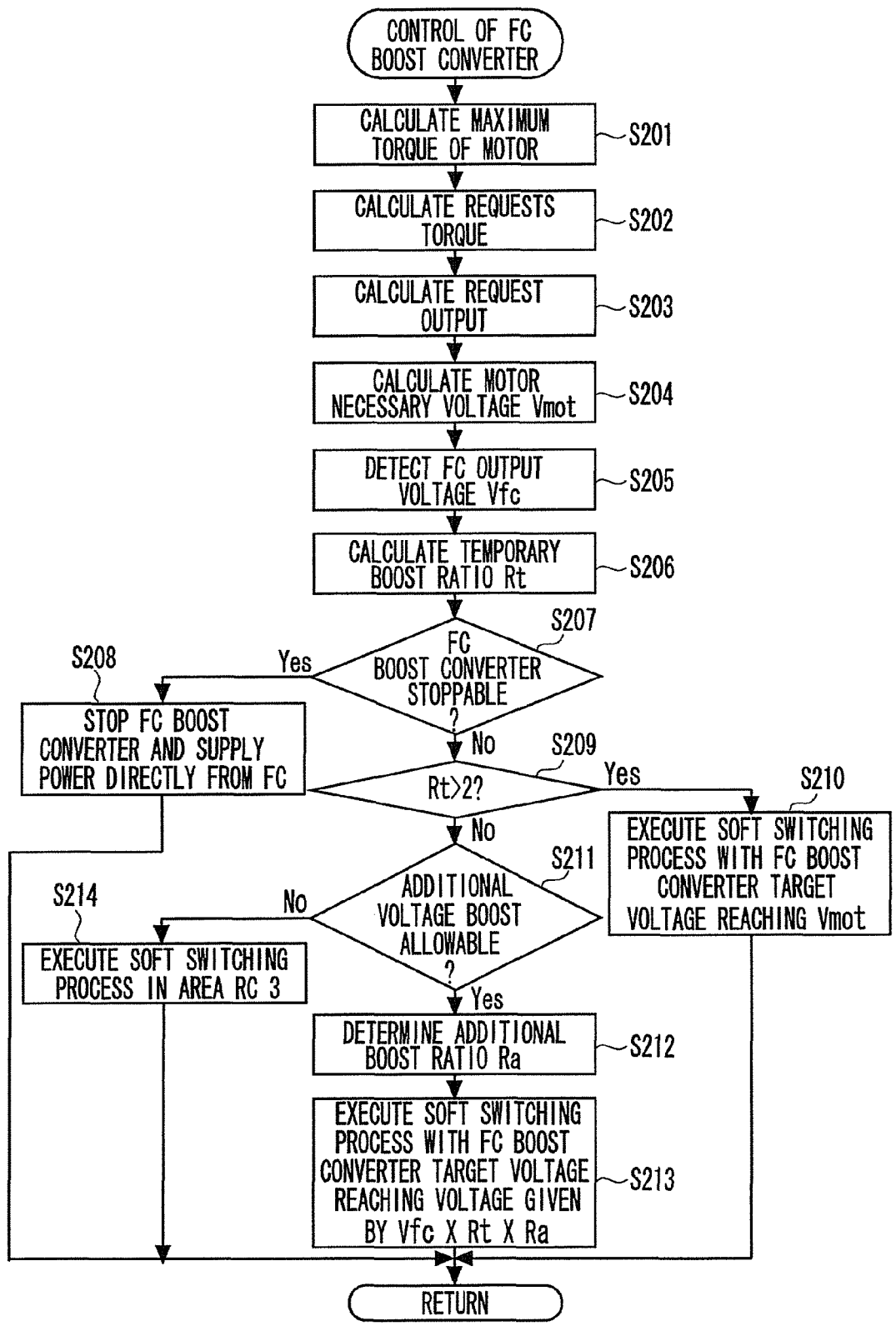
[FIG. 11A] A flowchart illustrating a flow of control conducted by the FC boost converter for accelerating efficiency of the fuel cell system according to the working example of the present invention.

According to the FC boost converter control shown in FIG. 11A, the boost operation of the FC boost converter 12 can be stopped to the greatest possible degree on the premise that the actuation of the motor 16 is ensured, whereby the switching loss can be restrained. Further, even in the case of performing the boost operation of the FC boost converter 12, the soft switching process is executed after setting the operation area to the soft switching area RC4 as much as possible, and therefore the switching loss of the FC boost converter 12 can be restrained to the greatest possible degree.

In the fuel cell system including the boost converter for the fuel cell according to one embodiment of the present invention, the smoothing capacitor C1 is connected onto the electric path which connects the fuel cell 11 to the coil L1. Hence, in the process in step S102, when the electric charge accumulated in the snubber capacitor C2 flows to the main boost circuit 12a via the auxiliary circuit 12b (FIG. 4B), it is feasible to relieve the application of the high voltage to the fuel cell 11 with this electric charge.

FIRST MODIFIED EXAMPLE

Figure 11B:
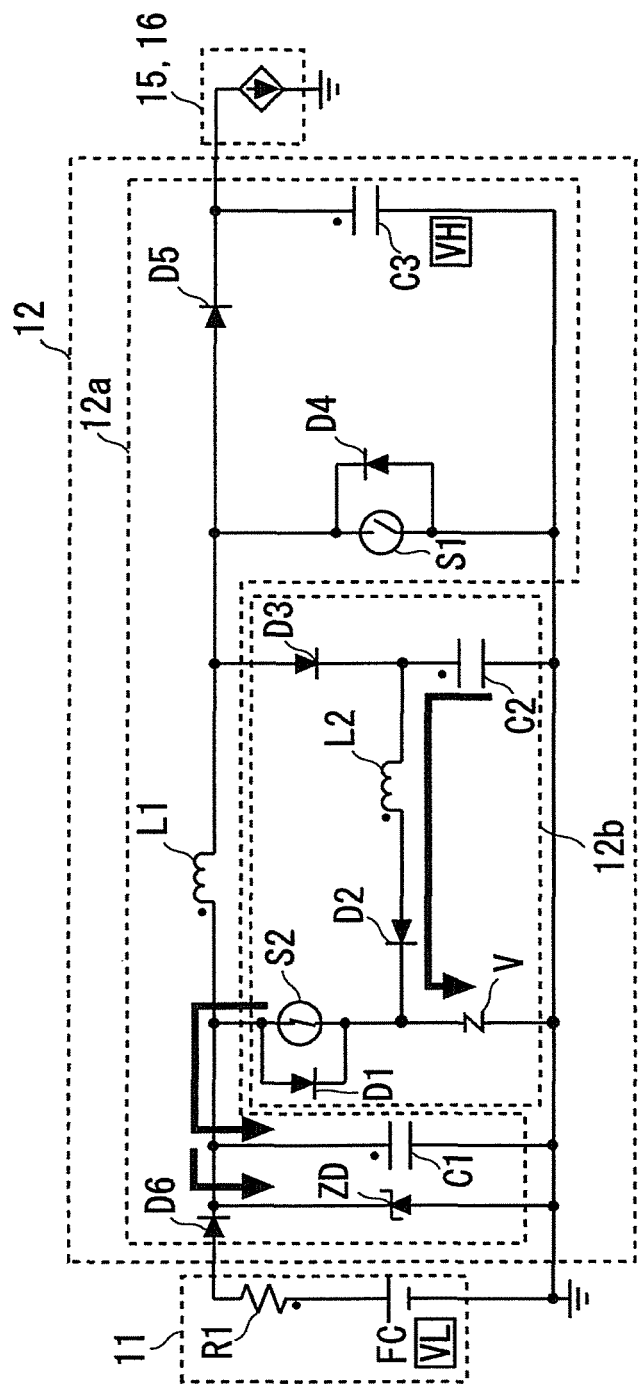
[FIG. 11B] A diagram of one example of a configuration of the FC boost converter according to a modified example.

It should be noted that the FC boost converter 12 may be modified as follows. To be specific, the circuit of the FC boost converter 12 is provided with the smoothing capacitor C1 on the electric circuit leading to the fuel cell 11 from the snubber capacitor C2 so that regenerated power accumulated in the snubber capacitor C2 is not inputted to the fuel cell 11, however, in addition to the smoothing capacitor C1, the following elements can be used. For example, a Zener diode or a varistor of which one end is earthed is provided on the electric path leading to the fuel cell 11 from the snubber capacitor C2. With this arrangement, the voltage equal to or higher than a specified voltage is restrained from being inputted to the fuel cell 11. FIG. 11B shows one example of a configuration of the electric circuit of the DC-DC converter according to the first modified example. As illustrated in FIG. 11B, the FC boost converter 12 according to the first modified example includes a Zener diode ZD and a varistor V of which one ends are earthed and a diode D6 serving as a rectifier, which are provided on the electric circuit leading to the fuel cell 11 from the snubber capacitor C2. Any one of these elements (the smoothing capacitor C1, the Zener diode ZD, the varistor V and the diode D6) which restrain the regenerated power from flowing to the fuel cell 11 may be provided, and the elements may also be provided in a state of combining the multiplicity of these elements.

In the case of applying the smoothing capacitor C1, such an effect is exhibited that the high voltage is restrained from being applied to the fuel cell 11 owing to the regenerated power flowing from the snubber capacitor C2, and, in addition, a fluctuation of the output voltage of the fuel cell 11 can be reduced. Further, the case of applying the Zener diode ZD and the varistor V involves setting specified voltages of these elements, which are determined from a point of view of protecting the fuel cell 11. The specified voltage is a voltage inputted to the fuel cell 11, e.g., the voltage lower than a voltage at which a catalyst electrode of the fuel cell 11 starts deteriorating due to agglutination etc of a catalyst. According to the Zener diode ZD and the varistor V, the current does not flow when in the normal operation, and hence the futile power is not consumed, which does not affect the fuel consumption of the vehicle 1. Further, the Zener diode ZD and the varistor V, if adopted, can prevent the rise etc in terminal voltage of the fuel cell 11 that is attributable to the controllability etc of the fuel cell 11 as we as preventing the increase in terminal voltage of the fuel cell 11 that is derived from the regenerated power. In the case of applying the diode D6, this diode D6 is connected to the electric path connecting the fuel cell 11 to the main boost circuit 12a as illustrated in FIG. 11B so that the regenerated power flowing from the snubber capacitor C2 does not flow to the fuel cell 11. Owing to the application of the diode D6, when the electric charge accumulated in the snubber capacitor C2 is regenerated into the main boost circuit 12a via the auxiliary circuit 12b, the regenerated power neither flows back to the fuel cell 11 nor is applied to the fuel cell 11.

SECOND MODIFIED EXAMPLE

Figure 11C:
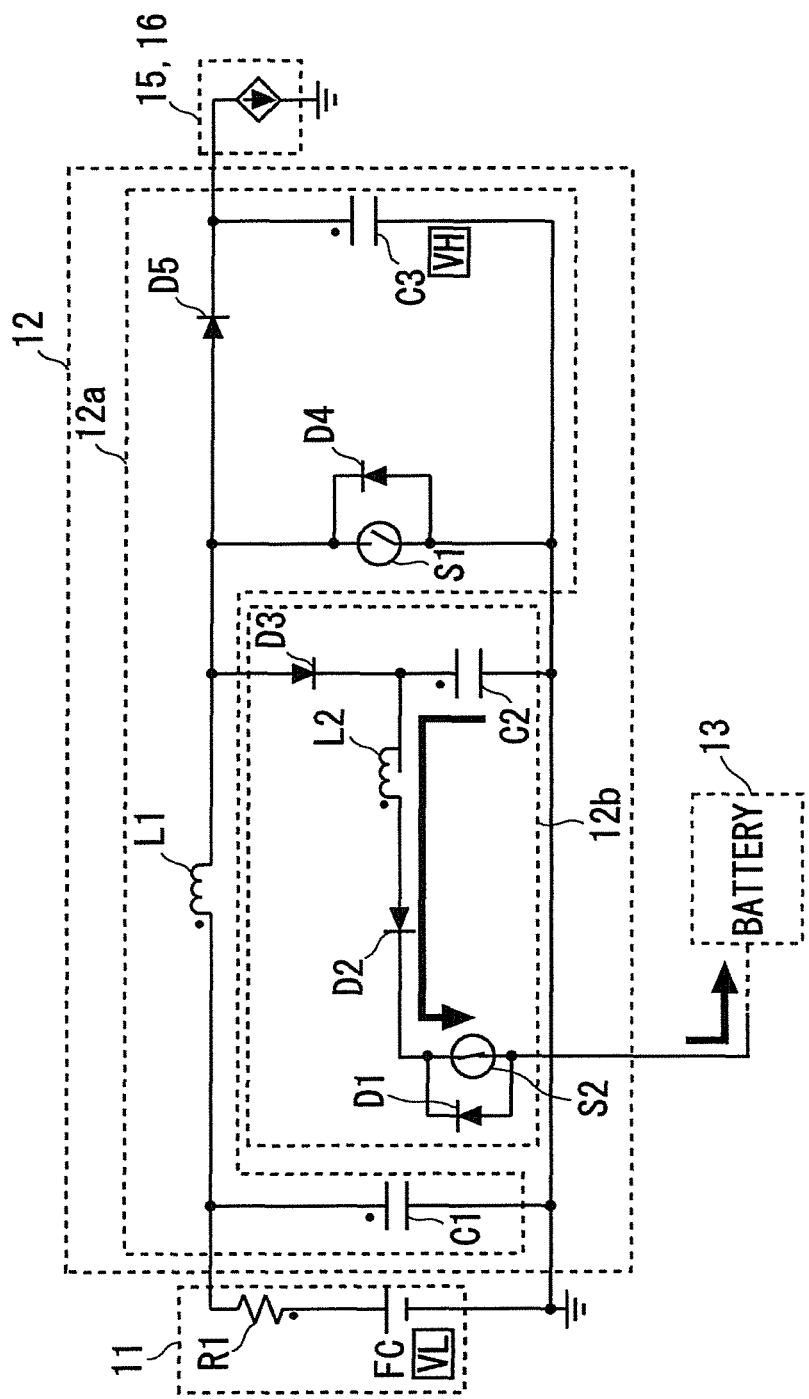
[FIG. 11C] A diagram of one example of a configuration of the FC boost converter according to a modified example.

Note that the FC boost converter 12 may also be modified as follows. Namely, the circuit of the FC boost converter 12 is configured so that the regenerated power accumulated in the snubber capacitor C2 returns onto the electric path which connects the fuel cell 11 to the main boost circuit 12a when performing the soft switching, however, the auxiliary boost circuit 12b may make the electric charge accumulated in the snubber capacitor C2 flow to the battery serving as the secondary battery, thus charging the battery 13 with the electricity. FIG. 11C illustrates one example of a configuration of the electric circuit of the FC boost converter 12 according to the second modified example. As shown in FIG. 11C, one end of the switching element S2 of the auxiliary boost circuit 12b is connected to the battery 13. With this connection, on the occasion of releasing the electric charge accumulated in the snubber capacitor C2, the battery 13 can be charged with this electric charge. According to this configuration, the regenerated power released from the snubber capacitor C2 does not flow to the fuel cell 11, and hence there is no possibility of causing the deterioration of the catalyst electrode etc when the high potential voltage is applied to the fuel cell 11. Moreover, in the fuel cell system 10, the output voltage of the battery 13 is set lower than the output voltage of the fuel cell 11, the electric charge can be released from the snubber capacitor C2 more surely than in the case of regenerating the electric charge accumulated in the snubber capacitor C2 into the main boost circuit 12a. Hence, as pointed out by use of FIG. 10B, the switching loss, which occurs when the ratio VH/VL is less than 2, can be obviated by taking the circuit configuration for discharging the electric charge accumulated in the snubber capacitor C2 into the battery 13.

Note that the effect in protecting the power source, which is obtained from the elements such as the smoothing capacitor, the Zener diode ZD, the varistor V and the diode D6 each provided in terms of protecting the fuel cell 11 and from the circuit configuration as in the second modified example, can be also acquired by applying these elements and the circuit configuration to a converter which boosts the voltage of the power source other than the fuel cell. Namely, the present invention can be applied to electric cars including the power source other than the fuel cell that serves as a motive power source and applied to any types of electric devices in which the electric power is used as a driving force.

THIRD MODIFIED EXAMPLE

As explained in the working example given above, in the process in S205 in the FC boost converter control shown in FIG. 11A, the output voltage of the fuel cell 11 is detected, which generates the electricity in accordance with the accelerator pedal opening degree detected by the accelerator pedal sensor 21. A third working example involves, with respect to the detection of the output voltage of the fuel cell 11, calculating the output voltage of the fuel cell 11 on the basis of the output of the fuel cell 11 (which will hereinafter be simply referred to as the FC output). Herein, the FC output is calculated according to the formula (1) that is given below.

(FC Output)=(Request Output)+(Auxiliary Machinery Request Output)+(Battery Charge(Discharge) Output)　　(1)

The auxiliary machinery request output of the output requested of the auxiliary machinery such as the hydrogen tank 17 and the compressor 18, the battery charge output is the output requested of the battery 13 when charged with the electricity, and the battery discharge output is the output of the battery 13 when discharged. If a residual electricity quantity of the battery 13 is less than an SOC threshold value, the FC output is calculated by including the battery charge output into the formula (1). If the residual electricity quantity of the battery 13 is equal to or larger than the SOC threshold value, the FC output is calculated by including the battery discharge output as a minus quantity into the formula (1). Then, the output voltage of the fuel cell 11 is calculated based on the FC output calculated in the formula (1) given above. To be specific, the ECU 20 has an IP characteristic map in which the FC output is associated with the output current of the fuel cell 11 and the IV characteristic map in which the output current of the fuel cell 11 is associated with the output voltage of the fuel cell 11, and the output voltage of the fuel cell 11 is calculated in a way that accesses these maps according to the FC output. According to the third modified example, the FC output is calculated by taking account of the output requested of the auxiliary machinery and the residual electricity quantity of the battery 13, thereby enabling the output voltage of the fuel cell 11 to be calculated by taking into consideration of the output requested of the auxiliary machinery and the residual electricity quantity of the battery 13.

Further, the formula (1) may be transformed into the formula (2) as follows.

$$(FC\ Output) = (Request\ Output) + (Auxiliary\ Machinery\ Request\ Output) + (Battery\ Charge(Discharge)\ Output) + (Switching\ Loss\ of\ FC\ Boost\ Converter\ 12) + (Switching\ Loss\ of\ Battery\ Boost\ Converter\ 14) \qquad (2)$$

With this transformation, the FC output is calculated in a way that takes account of the switching loss of the FC boost converter 12 and the switching loss of the battery boost converter 14, whereby the output voltage of the fuel cell 11 can be calculated by taking into consideration an amount of the switching loss of the FC boost converter 12 and an amount of the switching loss of the battery boost converter 14.

The calculation of the switching loss of the FC boost converter 12 involves providing a current sensor and a voltage sensor at the inlet port and the outlet port of the FC boost converter 12 and measuring the current and the voltage on the sides of the inlet/outlet ports of the FC boost converter 12. Further, the calculation of the switching loss of the battery boost converter 14 involves providing the current sensor and the voltage sensor at the inlet port and the outlet port of the battery boost converter 14 and measuring the current and the voltage on the sides of the inlet/outlet ports of the battery boost converter 14. Herein, if both of the FC boost converter 12 and the battery boost converter 14 perform the boost operations, the FC output is calculated in a way that takes account of the switching loss of the FC boost converter 12 and the switching loss of the battery boost converter 14. On the other hand, if only the battery boost converter 14 performs the boost operation, the FC output is calculated in a way that takes account of the switching loss of only the battery boost converter 14.

Moreover, it is preferable that the efficiency of actuating the motor 16 is taken into consideration with respect to applying the voltage to the inverter 15 for actuating the motor 16. For example, as explained in the working examples given above, when supplying the power to the motor 16 from the fuel cell 11, the FC boost converter 12 is not stopped, in which case the voltage applied to the inverter 15 is boosted by the FC boost converter 12. In the third modified example, the voltage applied to the inverter is determined from a map in which the efficiency characteristic of the loads including the inverter 15 and the motor 16 is associated with the voltage applied to the inverter 15 on the basis of the request torque and the number of revolutions of the motor 16. Then, with the boost operation of the FC boost converter 12, the output voltage of the fuel cell 11 is boosted up to the thus-determined voltage and applied to the inverter 15. For instance, the efficiency characteristic of the inverter 15 is conversion efficiency of the inverter 15 with respect to the voltage applied to the inverter 15, while the efficiency characteristic of the motor 16 is actuation efficiency of the motor 16 with respect to the voltage applied to the motor 16.

Figure 12A:
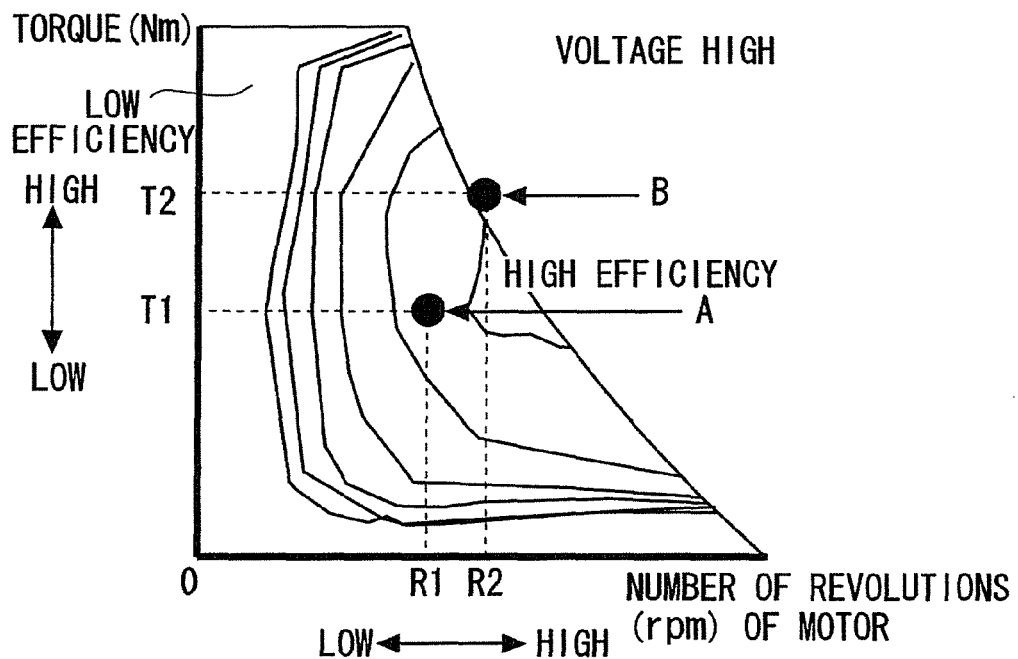
[FIG. 12A] A map displaying an area of an efficiency characteristic of the load in a case where the voltage applied to an inverter is high in the fuel cell system according to the working example of the present invention.
Figure 12B:
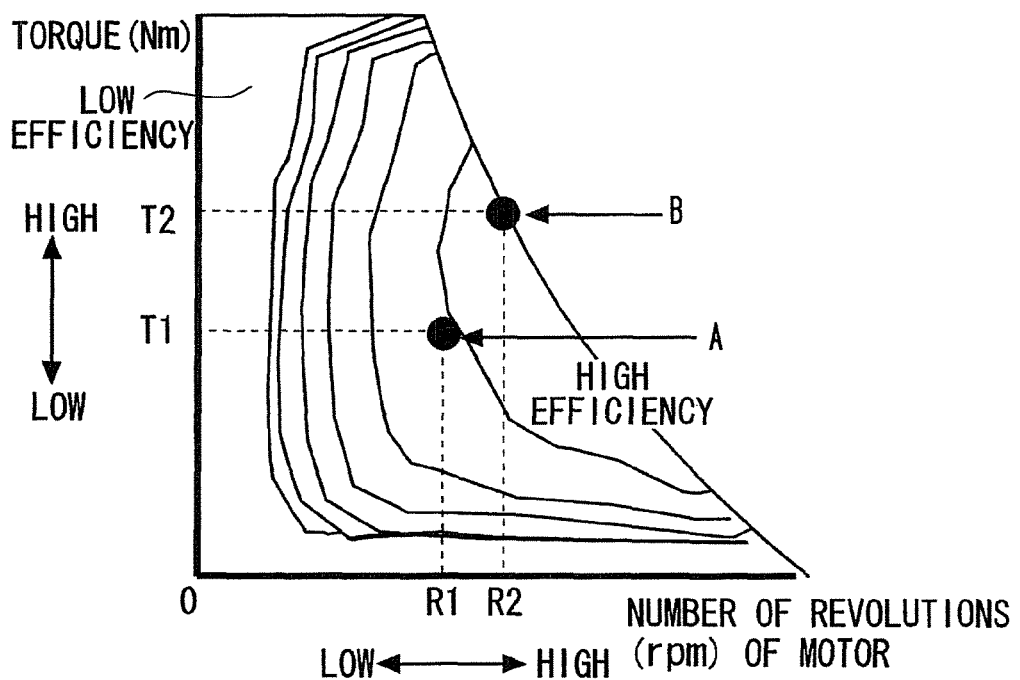
[FIG. 12B] A map displaying the area of the efficiency characteristic of the load in a case where the voltage applied to the inverter is intermediate in the fuel cell system according to the working example of the present invention.
Figure 12C:
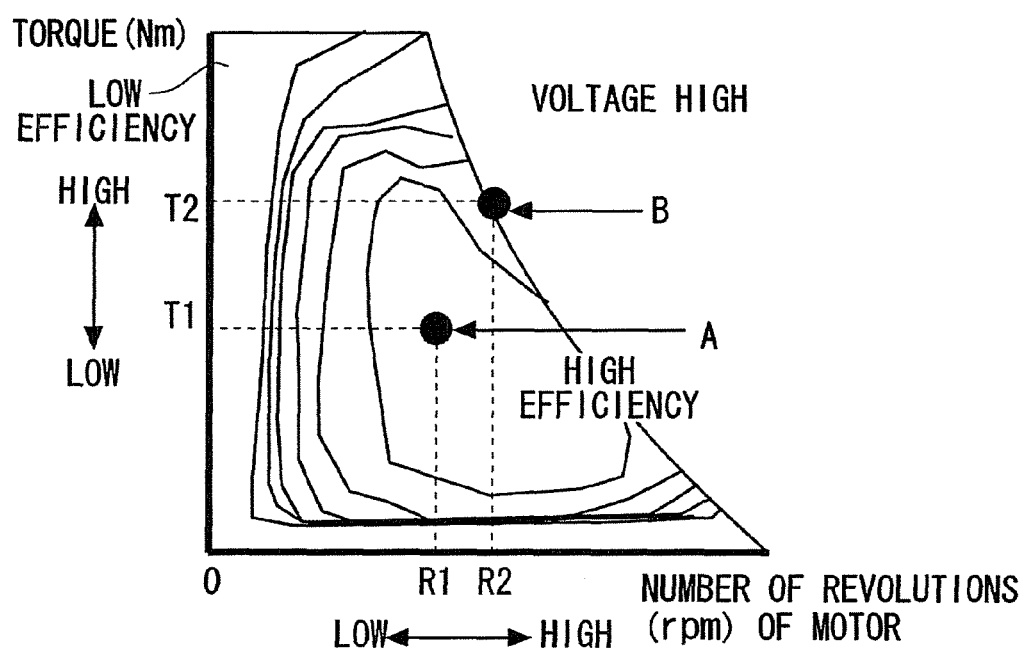
[FIG. 12C] A map displaying the area of the efficiency characteristic of the load in a case where the voltage applied to the inverter is low in the fuel cell system according to the working example of the present invention.

In the third modified example, the efficiency characteristic of the load is determined, and the area of the load efficiency characteristic as shown in FIGS. 12A, 12B and 12C is defined from the relation between the request torque and the number of revolutions of the motor 16. FIGS. 12A, 12B and 12C show maps in which the area of the load efficiency characteristic is divided stepwise according to an efficiency level, in which the request torque is given along the axis of ordinates, and the number of revolutions of the motor 16 is given along the axis of abscissa. FIG. 12A shows the map which displays the area of the load efficiency characteristic in the case where the voltage applied to the inverter 15 is high. FIG. 12B shows the map which displays the area of the load efficiency characteristic in the case where the voltage applied to the inverter 15 is intermediate. FIG. 12C shows the map which displays the area of the load efficiency characteristic in the case where the voltage applied to the inverter 15 is low. A point A in FIGS. 12A, 12B and 12C is determined based on the request torque T1 and the number-of-revolutions R1 of the motor 16, and a point B is determined based on the request torque T2 and the number-of-revolutions R2 of the motor 16.

The point A in FIG. 12C is included in the area exhibiting the high efficiency of the load efficiency characteristic, however, the points A in FIGS. 12A and 12B are excluded from the area exhibiting the high efficiency of the load efficiency characteristic. Accordingly, in the request torque T1 and the number-of-revolutions R1 of the motor 16, if the voltage applied to the inverter 15 is low, it is understood that the load efficiency characteristic is high. The point B in FIG. 12B is included in the area exhibiting the high efficiency of the load efficiency characteristic, however, the points B in FIGS. 12A and 12C are excluded from the area exhibiting the high efficiency of the load efficiency characteristic. Accordingly, in the request torque T2 and the number-of-revolutions R2 of the motor 16, if the voltage applied to the inverter 15 is intermediate, it is understood that the load efficiency characteristic is high. In the third modified example, the ECU 20 has the map described above, and the voltage applied to the inverter 15 is determined in terms of the load efficiency characteristic, thereby enabling the optimal voltage to be applied to the inverter 15.

SECOND WORKING EXAMPLE

A second working example of the fuel cell system according to the present invention will hereinafter be described based on FIGS. 13 through 15. A different point of the fuel cell system according to the second working example from the fuel cell system according to the first working example is the auxiliary circuit 12b in the FC boost converter 12 and a technology related to this circuit 12b. Such being the case, the discussion on the second working example will be made in a way that focuses on the different point.

Figure 13:
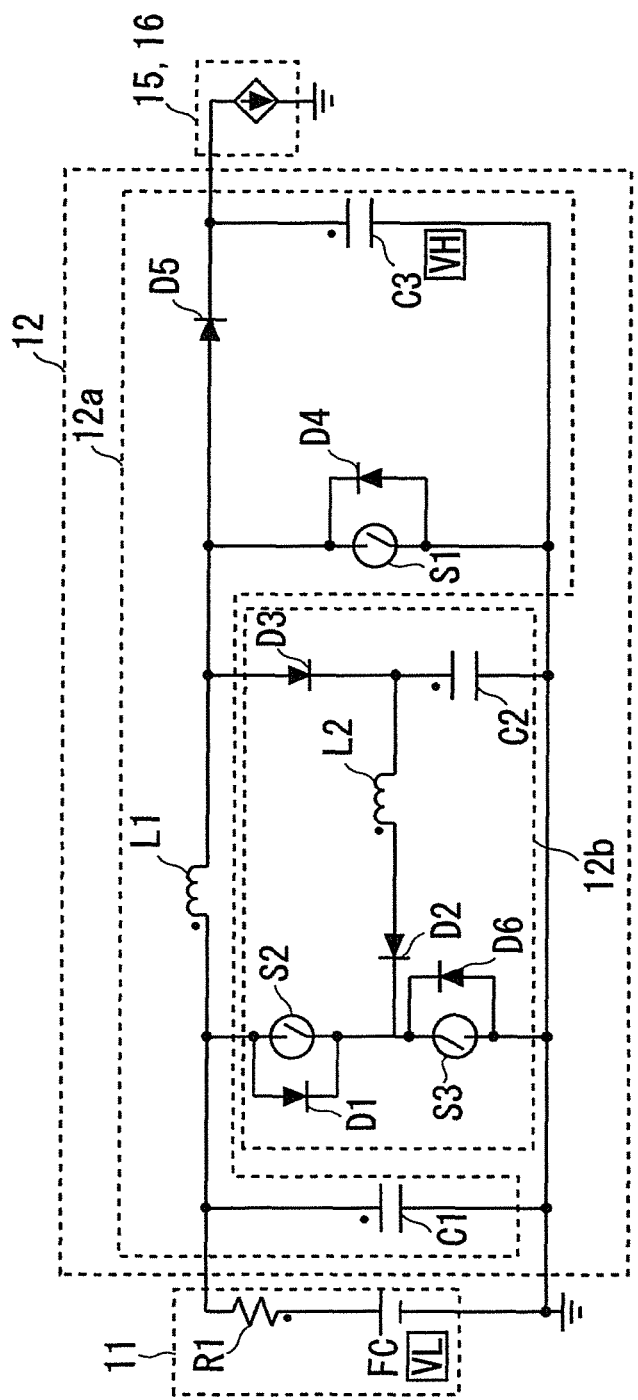
[FIG. 13] A second diagram illustrating the configuration of the electric circuit of the fuel cell system shown in FIG. 1, illustrating particularly the configuration of the electric circuit of the FC boost converter.

FIG. 13 is, similarly to FIG. 2, a diagram illustrating an electric configuration of the fuel cell system 10 by placing the focus on the FC boost converter 12. Herein, the auxiliary circuit 12b of the FC boost converter 12 shown in FIG. 13 is further provided with a switching circuit constructed of a switching element S3 and the diode D6. Specifically, one end of the switching element S3 is connected to the cathode terminal of the diode D2, and the other end of the switching element S3 is connected to the terminal, on the low potential side, of the fuel cell 11. This switching element S3 supports the discharge of the electric charge accumulated in the snubber capacitor C2 in the operation of the mode 2 in the previous soft switching process. This being the case, the second working example will discuss a new soft switching process including the switching operation of the switching element S3 with reference to FIGS. 14 and 15.

Figure 14:
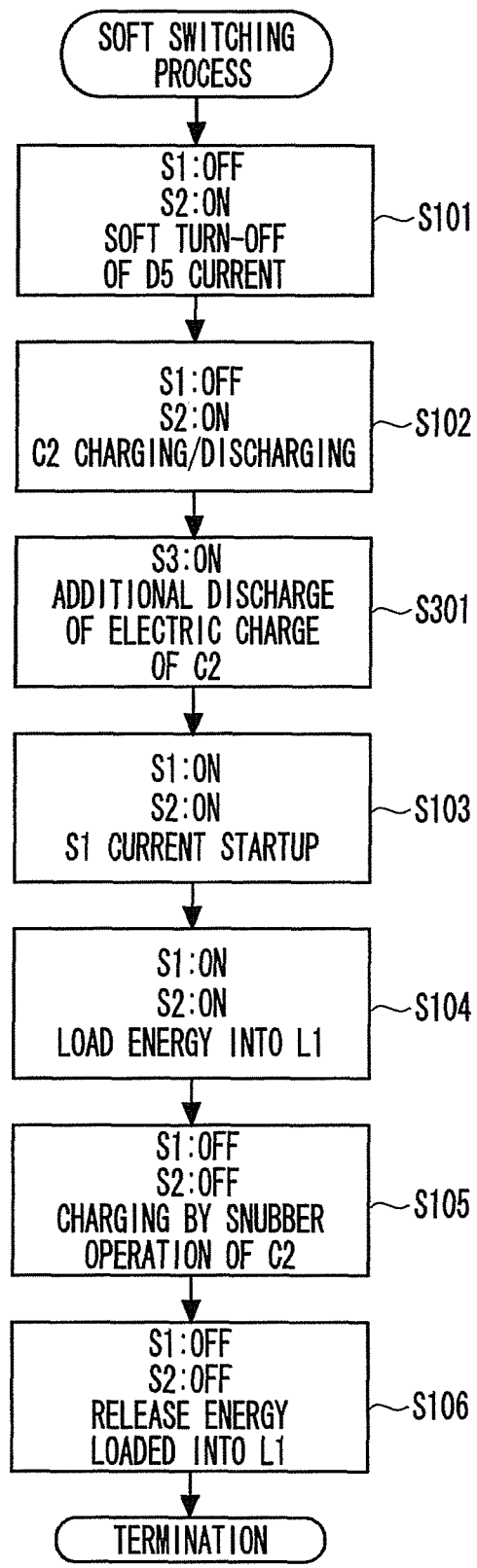
[FIG. 14] A flowchart illustrating a flow of the soft switching process for boosting the voltage, which is conducted by the FC boost converter shown in FIG. 13.
Figure 15:
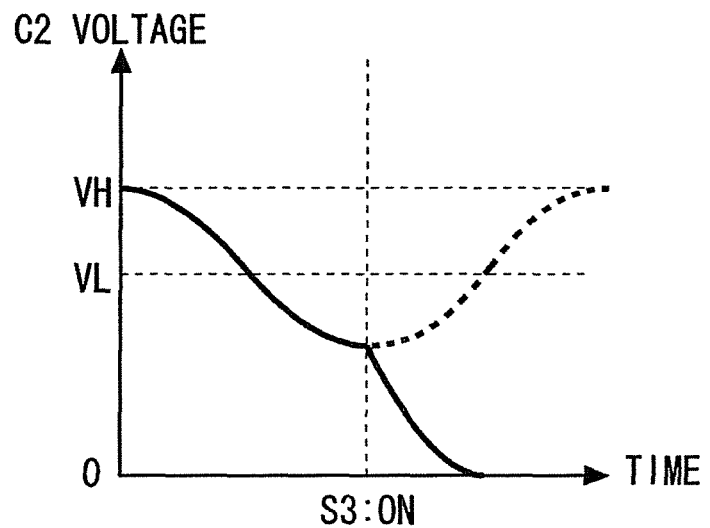
[FIG. 15] A diagram illustrating the correlation between the ratio VH/VL between the outlet port voltage of the FC boost converter according to the working example of the present invention and the inlet port voltage thereof and the residual voltage in the snubber capacitor when discharged in the case of performing the operation of the mode 2 of the soft switching process shown in FIG. 14.

FIG. 14 is, similarly to FIG. 3, a flowchart illustrating a flow of the soft switching process in the FC boost converter 12. A difference from the soft switching process shown in FIG. 3 is such a point that a new process in S301 according to the switching operation of the switching element S3 is inserted in between the processes in S102 and S103, i.e., between the respective operations of the mode 2 and the mode 3. Then, this different point will be described emphatically, while the detailed description of other processes is omitted in away that marks these processes with the same reference numerals and symbols as those in FIG. 3.

Herein, when the operation of the mode 2 is conducted in the process of S102, in the FC boost converter 12, the switching element S3 is in the turn-OFF state. Further, for clearly showing an effect of the switching operation of the switching element S3, in the relation between the outlet port voltage VH and the inlet port voltage VL of the FC boost converter 12, the ratio VH/VL defined as a parameter representing the electrical state of the FC boost converter 12 is set less than 2. In this case, the electric charge in the snubber capacitor C2 is released due to the half-wave resonance between the coil L2 and the snubber capacitor C2, however, as illustrated in FIG. 10B, it follows that the voltage of the snubber capacitor C2 does not become zero.

Herein, in the second working example, the switching element S3 is turned ON in the process of S301 at timing when the fluctuation in voltage of the snubber capacitor C2 due to the half-wave resonance reaches a bottom value. Then, as shown in FIG. 15, the electric charge, which is not completely released due to the half-wave resonance in the snubber capacitor C2, gets dispersed into the auxiliary circuit 12b via the switching element S3, and consequently the voltage of the snubber capacitor C2 can be further reduced. As a result, in the process of S103 after S301, when the switching element S1 is turned ON, the voltage applied to the switching element S1 can be decreased to the greatest possible degree, whereby the switching loss can be surely restrained. Note that in the relation between the outlet port voltage VH and the inlet port voltage VL of the FC boost converter 12, if the ratio VH/VL exceeds the predetermined value (if over 2 in the second working example), the electric charge of the snubber capacitor C2 is completely released owing to the operation of the mode 2, and hence the process of S301 is not necessarily required to be executed.

OTHER WORKING EXAMPLES

Further, as explained in the foregoing embodiment, when the load including the inverter 15 and the motor 16 is supplied with the electric power via the FC boost converter 12 from the fuel cell 11, the power loss occurs in the FC boost converter 12. This power loss includes a core, loss or the switching loss, which has a small degree of dependence on the magnitude of the electric power to be converted. Therefore, especially a decrease in power efficiency becomes conspicuous in the low-load area showing the small output power. Then, in the low-load area, there is a strong demand that the load should be supplied with the electric power of the fuel cell 11 without converting the electric power (a through mode, a bypass mode) by stopping the FC boost converter 12 or the load should be supplied with the electric power via the battery boost converter 14 from the battery 13.

Figure 16A:
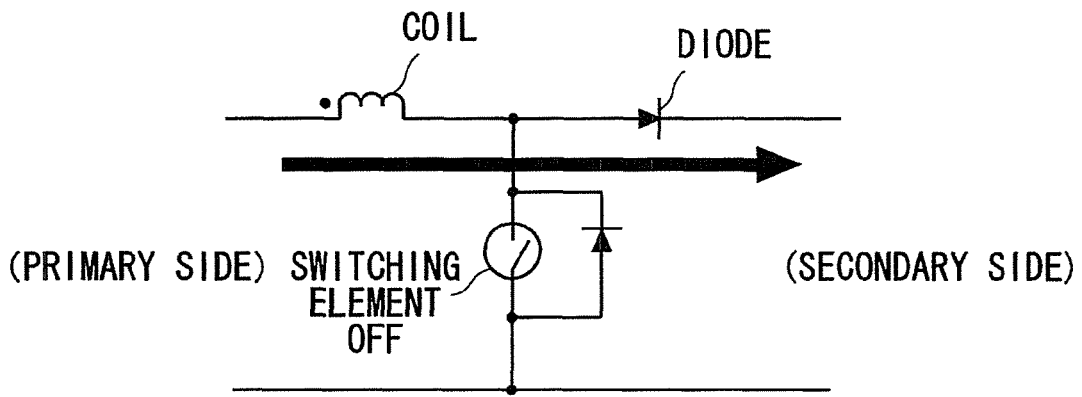
[FIG. 16A] A first diagram schematically showing a through mode in the converter.
Figure 16B:
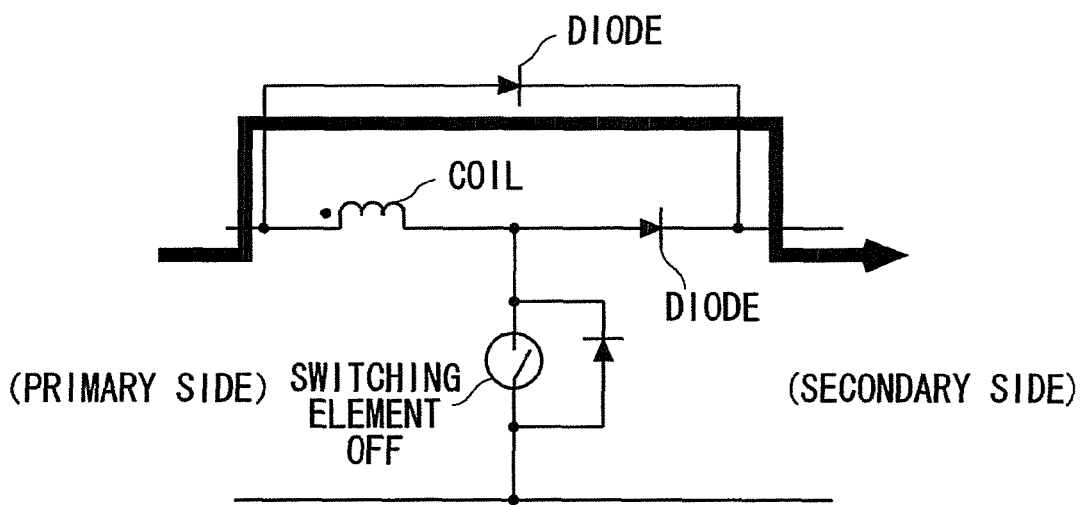
[FIG. 16B] A first diagram schematically showing a bypass mode in the converter.
Figure 16C:
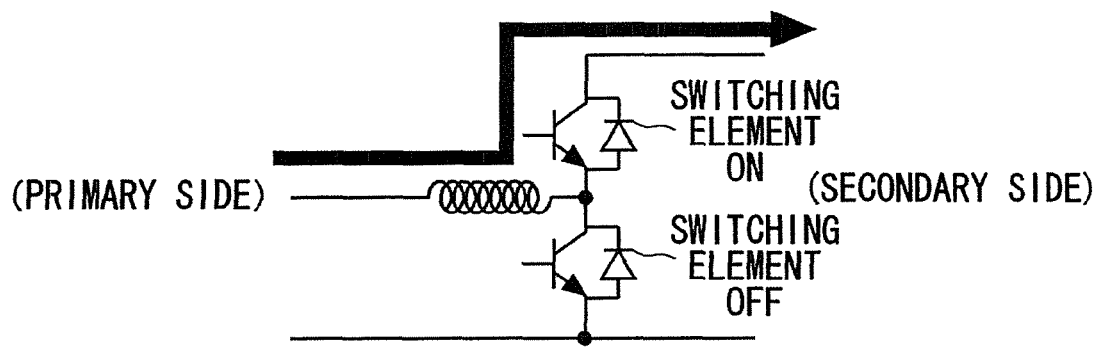
[FIG. 16C] A second diagram schematically showing the through mode in the converter.
Figure 16D:
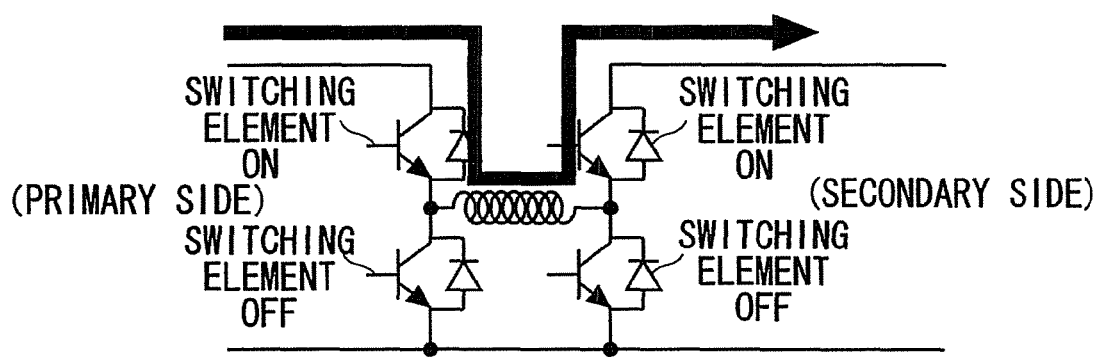
[FIG. 16D] A third diagram schematically showing the through mode in the converter.

Herein, the through mode and the bypass mode in the general type of converter will be briefly described based on FIGS. 16A-16D. Note that an arrowhead of a bold line in FIGS. 16A-16D represents a flow of the current in each converter. FIG. 16A is a diagram showing how the through mode is when the converter is the boost type converter (the FC boost converter 12 described above corresponds to this type of converter). The voltage on the primary side can be applied as it is to the secondary side by setting the switching element for boosting in the turn-OFF state. FIG. 16B is a diagram showing how the bypass mode is when the converter is the boost type converter, in which a diode for bypass is connected in parallel to a series module constructed of a coil for boosting and a diode. The voltage on the primary side is bypassed and thus can be applied to the secondary side by setting the switching element for boosting in the turn-OFF state. FIG. 16C is a diagram showing how the through mode is when the converter is a half-bridge type converter. In the two switching elements for boosting, the switching element on the upper side in FIG. 16C is set in the turn-ON state, while the switching element on the lower side is set in the turn-OFF state, whereby the voltage on the primary side can be applied as it is to the secondary side. FIG. 16D is a diagram showing how the through mode is when the converter is a full-bridge type converter. In the four switching elements for boosting, the two switching elements on the upper side in FIG. 16D are set in the turn-ON state, while the two switching elements on the lower side are set in the turn-OFF state, whereby the voltage on the primary side can be applied as it is to the secondary side. The configuration illustrated in each of FIGS. 16B-16D is different from the FC boost converter 12 described above, however, supposing that the FC boost converter 12 adopts these configurations, the through mode and the bypass mode can be realized by controlling the switching elements illustrated in these drawings.

On the other hand, the fuel cell 11 is required to avoid a sintering phenomenon of the catalyst for improving the durability. The sintering phenomenon is a phenomenon that a Pt catalyst on the electrode of the fuel cell 11 is said to be agglutinated and induced by oxidation-reduction reaction to water (and protons) on the surface of the Pt catalyst. Further, it is known that the oxidation-reduction reaction such as this is brought about at a comparatively high potential, in which the terminal voltage of the fuel cell 11 is in the vicinity of the open circuit voltage (OCV).

Incidentally, when the fuel cell 11 comes to have the low load, the terminal voltage of the fuel cell 11 gets close to the open circuit voltage (OCV) according to the IV characteristic of the fuel cell 11. As described above, however, when stopping the FC boost converter 12, the terminal voltage of the fuel cell 11 can not be controlled, and it is difficult to avoid the deterioration of the catalyst due to the oxidation-reduction reaction.

Then, in the case of stopping the FC boost converter 12, the terminal voltage of the fuel cell 11 may be controlled by controlling the voltage, on the output side, of the FC boost converter 12 by the battery boost converter 14 provided in parallel to the FC boost converter 12. Namely, the ECU 20 may monitor the terminal voltage of the fuel cell 11 and may control the output voltage of the battery boost converter 14 so that the terminal voltage of the fuel cell 11 is less than a reference value for avoiding the sintering phenomenon. This reference value may be set as, e.g., an experimental value or an empirical value.

Furthermore, if the terminal voltage of the battery 13 is high, if the request voltage of the inverter 15 is low and if the boost ratio of the battery boost converter 14 can not be set equal to or larger than 1, conversely the battery boost converter 14 must be stopped. In such a case, for avoiding the sintering phenomenon, the FC boost converter 12 may control the terminal voltage of the fuel cell 11 on the basis of the request voltage of the inverter 15 without stopping the FC boost converter 12.

In the case described above, anyway, it is required for controlling the terminal voltage of the fuel cell 11 under the reference value that the current be drawn from the fuel cell 11 and the electric power be consumed. The electric power in this case is consumed normally by the load including the inverter 15 and the motor 16. With respect to surplus power, however, in the state where the SOC of the battery 13 is low and the electric power can be accumulated in the battery 13, the power is accumulated in the battery 13, while the electric power unable to be accumulated in the battery 13 may be consumed by the auxiliary machinery (an air-conditioner, illuminations, a pump, etc).

Moreover, in the fuel cell system 10 also serves as a system for cutting off the output of the fuel cell 11 upon a collision of the vehicle 1. Specifically, a relay circuit for switching ON/OFF the electric connection with the inverter 15 and the battery boost converter 14 is provided on a downstream side of the FC boost converter 12 of the fuel cell system 10. Note that as obvious from the already-explained configuration, the fuel cell system 10 is contrived such that the quantity of the current flowing on the downstream side of the FC boost converter 12 is small. Therefore, the fuel cell system 10 is the system adopting a smaller size (a lower current) of relay circuit than the relay circuit provided just posterior to the fuel cell in the same type of existing system.

Then, the ECU 20 of the fuel cell system 10 is a unit which always monitors, based on an output of a collision detection sensor provided in the vehicle 1, whether the collision happens or not, and, in the event of detecting the collision, cuts off the electrical connection between the FC boost converter 12, the inverter 15 and the battery boost converter 14 by controlling the relay circuit.

The invention claimed is:

1. A fuel cell system comprising: a fuel cell as a DC power source; and a boost unit boosting an output voltage of said fuel cell,
   said boost unit including:
   a main boost unit having a switch and a coil, and boosting the output voltage of said fuel cell with counter electromotive force of said coil that is generated by said switch performing a switching operation with respect to said coil; and
   an auxiliary boost unit having a snubber capacitor adjusting a potential difference between two poles of said switch with a quantity of accumulated electricity, and reducing a switching loss of said switch by adjusting the quantity of accumulated electricity of said snubber capacitor when performing the switching operation,
   wherein said auxiliary boost unit conducts the electricity of said snubber capacitor, which is released when reducing the quantity of accumulated electricity of said snubber capacitor, to a processing unit other than said fuel cell to thereby process the electricity,
   wherein said auxiliary boost unit regenerates the electricity released when reducing the quantity of accumulated electricity of said snubber capacitor into an electric path which connects said main boost unit as said processing unit to said fuel cell to thereby process the electricity, said fuel cell system further comprising a constant voltage unit which, if the voltage of said electric path, which fluctuates due to the regenerated power of said auxiliary boost unit, exceeds a specified voltage, conducts the electricity of said electric path to the earth.

2. The fuel cell system according to claim 1, wherein said auxiliary boost unit regenerates the electricity released when reducing the quantity of accumulated electricity of said snubber capacitor into an electric path which connects said main boost unit as said processing unit to said fuel cell to thereby process the electricity, said fuel cell system further comprising a buffering unit which buffers a fluctuation in voltage of said electric path, which is caused by the regenerated electric power of said auxiliary boost unit.

3. The fuel cell system according to claim 1, wherein said auxiliary boost unit regenerates the electricity released when reducing the quantity of accumulated electricity of said snubber capacitor into an electric path which connects said main boost unit as said processing unit to said fuel cell to thereby process the electricity, said fuel cell system further comprising a rectifying unit that prevents the regenerated power of said auxiliary boost unit from flowing to said fuel cell via said electric path.

4. The fuel cell system according to claim 1, wherein said main boost unit includes:
   a first coil having one end connected to a cathode of said fuel cell;
   a first switch having one end connected to the other end of said first coil and having the other end connected to an anode of said fuel cell;
   a first diode connected, on the anode side, to the other end of said coil and connected, on the cathode side, to said load; and
   a smoothing capacitor connecting the cathode side of said first diode to the other end of said first switch, and
   said auxiliary boost unit includes:
   a second diode connected, on the anode side, to an electric path branching off from said electric path connecting said first coil to said first switch;
   said snubber capacitor connecting the cathode side of said second diode to the other end of said first switch;
   a second coil having one end connected to an electric path branching off from said electric path connecting the cathode side of said second diode to said snubber capacitor;
   a third diode connected, on the anode side, to the other end of said second coil; and
   a second switch having one end connected to the cathode side of said third diode and having the other end connected to said processing unit.

5. A boost converter for a fuel cell, for boosting an output voltage of said fuel cell as a DC power source and thus supplying the output voltage to a load, comprising:
   a main boost unit having a switch and a coil, and boosting the output voltage of said fuel cell with counter electromotive force of said coil that is generated by said switch performing a switching operation with respect to said coil; and
   an auxiliary boost unit having a snubber capacitor adjusting a potential difference between two poles of said switch with a quantity of accumulated electricity, and reducing a switching loss of said switch by adjusting the quantity of accumulated electricity of said snubber capacitor when performing the switching operation,
   wherein said auxiliary boost unit conducts the electricity of said snubber capacitor, which is released when reducing the quantity of accumulated electricity of said snubber capacitor, to a processing unit other than said fuel cell to thereby process the electricity, wherein said auxiliary boost unit regenerates the electricity released when reducing the quantity of accumulated electricity of said snubber capacitor into an electric path which connects said main boost unit as said processing unit to said fuel cell to thereby process the electricity, said fuel cell system further comprising a constant voltage unit which, if the voltage of said electric path, which fluctuates due to the regenerated power of said auxiliary boost unit, exceeds a specified voltage, conducts the electricity of said electric path to the earth.

* * * * *